United States Patent
Mazur et al.

(10) Patent No.: US 12,099,345 B2
(45) Date of Patent: Sep. 24, 2024

(54) SYMBOLIC ACCESS OF INDUSTRIAL DEVICE SYSTEMS AND METHODS

(71) Applicant: Rockwell Automation Technologies, Inc., Mayfield Heights, OH (US)

(72) Inventors: David C. Mazur, Mequon, WI (US); Jonathan Alan Mills, Mayfield Heights, OH (US); Todd A. Wiese, Hubertus, WI (US); Rob A. Entzminger, Shawnee, KS (US); Roberto S. Marques, Cedarburg, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/842,078

(22) Filed: Jun. 16, 2022

(65) Prior Publication Data

US 2023/0152784 A1    May 18, 2023

Related U.S. Application Data

(60) Provisional application No. 63/276,973, filed on Nov. 8, 2021.

(51) Int. Cl.
G05B 19/418    (2006.01)

(52) U.S. Cl.
CPC .................. *G05B 19/41835* (2013.01); *G05B 2219/31368* (2013.01)

(58) Field of Classification Search
None
See application file for complete search history.

(56) References Cited

U.S. PATENT DOCUMENTS

| 2005/0071481 A1 | 3/2005 | Danieli |
| 2006/0259160 A1 | 11/2006 | Hood et al. |

(Continued)

FOREIGN PATENT DOCUMENTS

| EP | 3467597 A1 | 4/2019 |
| EP | 3627260 A1 | 3/2020 |

OTHER PUBLICATIONS

PersonalSCADA 2.0 User's Guide, 2002 Eutech Cybernetics Pte Ltd (Year: 2002).*

(Continued)

*Primary Examiner* — Carlos R Ortiz Rodriguez
(74) *Attorney, Agent, or Firm* — Fletcher Yoder, P.C.

(57) ABSTRACT

Embodiments of this present disclosure may include systems that perform operations including receiving a first symbol instance from an industrial automation device. The first template object instance may characterize a dataset accessible to the industrial automation device. Symbol object instances may inherit a categorization with respect to categories associated with the industrial automation device including an identity, a state, a runtime status, a maintenance status, sustainability information, or any combination thereof. The operations may include identifying a type of the industrial automation device based on the first symbol instance and generating template data based on the type of the industrial automation device and the first symbol instance. The template data may include values associated with the dataset and the categories associated with the first symbol instance. The operations may also include sending a control signal to the industrial automation device based on the template data.

20 Claims, 14 Drawing Sheets

(56) References Cited

U.S. PATENT DOCUMENTS

| | | |
|---|---|---|
| 2008/0098387 A1 | 4/2008 | Lo et al. |
| 2014/0336785 A1 | 11/2014 | Asenjo et al. |
| 2017/0285623 A1 | 10/2017 | Figoli et al. |
| 2020/0096965 A1 | 3/2020 | Mazur et al. |
| 2021/0003996 A1 | 1/2021 | Nagabhairava et al. |

OTHER PUBLICATIONS

Garbrecht, Steven D. "The Benefits of Component Object-Based SCADA and Supervisory System Application Development." Invensys, Wonderware, Part 15-0162 (2006): 1-16. (Year: 2006).*
Gabbar, Hossam A. "Intelligent topology analyzer for improved plant operation." Industrial Management & Data Systems 107.2 (2007): 229-250. (Year: 2007).*
U.S. Appl. No. 17/842,130, filed Jun. 16, 2022, David C. Mazur.
U.S. Appl. No. 17/842,313, filed Jun. 16, 2022, Jonathan Alan Mills.
Extended European Search Report for Application No. 22205338.1 mailed Feb. 13, 2023, 10 pages.
Extended European Search Report for Application No. 22204715.1 mailed Feb. 13, 2023, 9 pages.
Extended European Search Report for Application No. 22205547.7 mailed Feb. 16, 2023, 10 pages.
Communication pursuant to Article 94(3) EPC for Application No. 22204715.1 mailed Dec. 7, 2023, 4 pages.
Communication pursuant to Article 94(3) EPC for Application No. 22205338.1 mailed Nov. 29, 2023, 5 pages.
Communication pursuant to Article 94(3) EPC for Application No. 22205547.7 mailed Dec. 15, 2023, 6 pages.

* cited by examiner

SYMBOLIC ACCESS OF INDUSTRIAL DEVICE SYSTEMS AND METHODS

CROSS-REFERENCE TO RELATED APPLICATION

This application claims priority to and the benefit of U.S. Patent Application No. 63/276,973, entitled "INDUSTRIAL DEVICE DISCOVERY AND CONSUMPTION SYSTEMS AND METHODS", filed Nov. 8, 2021, which is herein incorporated by reference in its entirety for all purposes.

BACKGROUND

This disclosure generally relates to industrial automation systems and, more particularly, to control systems and methods based on symbolic data access.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

Industrial automation systems may include automation control and monitoring systems. The automation control and monitoring systems may monitor and/or receive status information and/or sensing data from a wide range of devices, such as valves, electric motors, various types of sensors, other suitable monitoring devices, or the like. In addition, one or more components of the automation control and monitoring systems, such as programming terminals, automation controllers, input/output (IO) modules, communication networks, human-machine interface (HMI) terminals, and the like, may use the statuses and/or collected information to provide alerts to operators to change or adjust an operation of one or more components of the industrial automation system (e.g., such as adjusting operation of one or more actuators), to manage the industrial automation system, or the like.

Recent developments in industrial automation systems have increased complexity of industrial automation devices and interactions between the devices. New generations of industrial automation devices are expected to interface with, or control, legacy devices. Different brands, types, and generations of industrial automation devices may each generate different types of data for different purposes and with different measurement units. For example, voltages sensed for one motor drive might be in volts (V) but be sensed in kilovolts (kV) from another motor drive. Thus, industrial automation systems and methods that promote coordination between many different types of legacy industrial automation devices may be desired.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a method may include receiving, via a processor, a first symbol object instance of one or more symbol object instances from an industrial automation device. The first template object may characterize a dataset stored in a memory component accessible to the industrial automation device. Each of the one or more symbol object instances may be categorized with respect to one or more categories. The one or more categories may include an identity of the industrial automation device, a state of the industrial automation device, a runtime status of the industrial automation device, maintenance status associated with the industrial automation device, sustainability information of the industrial automation device, or any combination thereof. The method may include identifying, via the processor, a type of the industrial automation device based on the first symbol object instance. The method may also include generating, via the processor, template data based on the type of the industrial automation device and the first symbol object instance. The template data may include one or more instantaneous values associated with the dataset and one or more of the categories associated with the first symbol object instance. The method may also include sending, via the processor, a control signal to the industrial automation device based on the template data.

In another embodiment, a tangible, non-transitory, computer-readable medium may include instructions that, when executed by a processor, causes a control system to perform operations. The operations may include receiving a first symbol object instance of one or more symbol object instances from an industrial automation device. The first symbol object instance may characterize a dataset stored in a memory component accessible to the industrial automation device. Each of the one or more symbol object instances may be categorized with respect to one or more categories. The one or more categories may include an identity of the industrial automation device, a state of the industrial automation device, a runtime status of the industrial automation device, maintenance status associated with the industrial automation device, sustainability information of the industrial automation device, or any combination thereof. The operations may include identifying a type of the industrial automation device based on the first symbol object instance and identifying a child component based on the type of the industrial automation device and the first symbol object instance. The operations may include the control system generating template data based on the child component, the type of the industrial automation device, and the first symbol object instance. The template data may include one or more instantaneous values associated with the dataset and one or more of the categories associated with the first symbol object instance. The operations may include sending a control signal to the industrial automation device based on the template data.

In yet another embodiment, a tangible, non-transitory, computer-readable medium may include instructions that, when executed by a processor, causes a control system to perform operations including receiving a first symbol object instance of one or more symbol object instances from an industrial automation device. The first symbol object instance may characterize a dataset stored in a memory component accessible to the industrial automation device. Each of the one or more symbol object instances may be categorized with respect to one or more categories. The one or more categories may include an identity of the industrial automation device, a state of the industrial automation device, a runtime status of the industrial automation device, maintenance status associated with the industrial automation device, sustainability information of the industrial automation device, or any combination thereof. The operations may include the control system identifying a type of the industrial automation device based on the first symbol object instance and generating template data based on the type of the industrial automation device and the first symbol object instance. The template data may include one or more instantaneous values associated with the dataset and one or more of the categories associated with the first symbol object instance. The operations may include the control system sending a control signal to the industrial automation device based on the template data.

BRIEF DESCRIPTION OF THE DRAWINGS

These and other features, aspects, and advantages of the present disclosure may become better understood when the following detailed description is read with reference to the accompanying drawings in which like characters represent like parts throughout the drawings, wherein.

DETAILED DESCRIPTION

Figure 1:
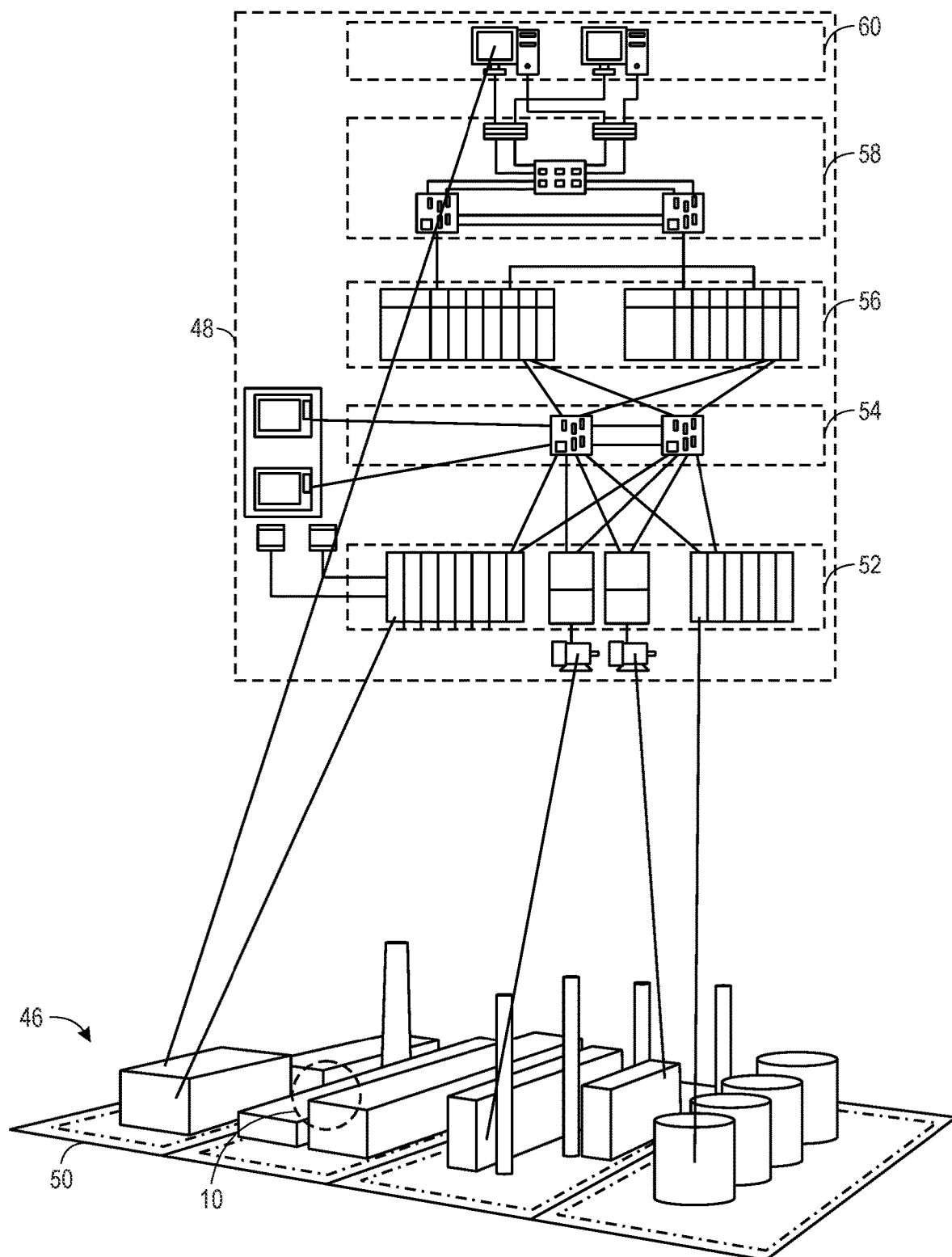
FIG. 1 is a diagrammatic representation of an example industrial automation system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Connecting intelligent devices to the connected enterprise has been a time consuming and complex process for customers integrating new devices into existing systems. A universal and easily connected interface for obtaining data from various types of devices operating using different communication protocols, different information model formats, manufactured by different entities, and the like, continues to be a challenge. Instead, customers are asked to connect and model the acquired data within a local controller or create product specific profiles that may characterize the data collected from other devices in a manner that is useful to the local controller. Furthermore, developments in industrial systems have resulted in increased complexity of interactions between the currently installed devices and newer generations of industrial automation devices. With this in mind, the present disclosure is generally directed towards using symbolic data operations to communicate between devices in an industrial automation system, thereby enabling industrial automation devices that use different information model formats to have consistent reporting and control operations and functions. Included in symbolic data operations may be the ability to encode an addressing path (e.g., internal object identifier (IOI) path to an object) which identifies through a logical operation the data table represented by a symbol object instance with a more efficient access operation. The addressing path and the symbol object instance represent the same data but allow access in different ways to assist with better performance needs. By using systems and methods to reference operational data in a manner using labels understandable to both machine and software, fewer look-up operations may be used to route data from a data source to a data consuming device, and thus fewer computing operations may be used to implement control and processing operations relative to other systems not using symbolic data operations.

A symbol (e.g., symbol object instance) may be considered a textual name used to represent a specific related instance of data or value, within a data storage entity. For example, a symbol object instance named "Heatsink Temperature of Control Board" represents a sampled temperature value of a temperature sensor that is stored in a computing resource collecting the sampled temperature value from the heatsink temperature probe. The symbol object instance may be referenced along with the template to access the sampled temperature value. For example, a control system using that sampled temperature value would reference DataStructure.HeatsinkTemperatureOfControlBoard when accessing the sampled temperature value as opposed to an alternative address path notion. In some cases, a symbol object instance may help decode a specific data portion from a larger set of data and the specific data portion may be associated to a data type definition from a corresponding defined template object instance. The template object instance defines data types and formatting of the data portions of the larger set of data that is used when decoding the data portion from the larger set of data based on the symbol object instance.

A template may be considered a format of the data (or value) that identifies how to interpret (or how to use) the specific related instance of data or value stored within a data storage entity. The template may be a globally set definition, and a specific instance or use of the template for a specific device and corresponding data set may be referred to as a template object instance. For example, a template for a temperature value may indicate that there are four bytes of memory that should be read from the storage entity, and that the value may have both positive and negative values represented in the range of temperatures that can be expressed. A template object instance corresponding to the template for the template value may indicate that, for a specific device, temperature values of a dataset stored in association with that device have four bytes and may have a positive or a negative value. A template may define a format of another template, such as when a first template references multiple nested templates. The format used to interpret each of the multiple nested template is defined by the first template.

In some cases, a symbol may decode a specific data portion from a larger set of data using a data type definition from a corresponding defined template object instance. The template may define data types and formatting of the data to be decoded from a larger set of data based on the symbol.

The implementation of symbolic data operations using systems and methods detailed below allows certain systems to interact with disparate systems (e.g., different information model formats) using a standardized, flexible, and extendable interface that can be used to expose a broad range of data models provided from other devices. The symbolic data operations may be based on at least two underlying data objects a symbol object instance and a template object. An industrial automation device may use symbolic data operations, as opposed to traditional class, instance, and attribute (CIA) lookup operations when communicating with other devices. The symbolic data operations may involve control systems of the industrial automation system accessing data associated with an industrial automation device through symbolic and template object instances of the information model formats. Furthermore, the symbolic data operations may improve operation of the industrial automation system by reducing an amount of computing resources used to access and identify data associated with the industrial automation device.

By using these described systems and methods, the industrial automation system may exchange data using symbol/template data access techniques (e.g., symbolic data operations) that may be enabled via symbol object instances and template object instances. As a result, one or more intermediary control systems may be incorporated into the industrial automation system to aggregate or process data generated by industrial automation devices. Indeed, an industrial automation system using symbolic data operations may bypass certain operations. The operations that may be bypassed include operations like writing specific programmable logic controller (PLC) code to extract data from one or more industrial automation devices to make the data accessible to a control system, aggregating the accessed data from the industrial automation devices, extracting the data for consumption by a human machine interface, programming respective processing layers in a software application to process (e.g., identify trends) the data, and the like. Using the symbolic data operations, thus bypassing at least some of the operations, may make overall control and/or monitoring operations of the industrial automation system more efficient to execute during runtime and during initial commissioning. The control and/or monitoring operations may be made more efficient by using the gateway devices as a component that collects data from various sources and performs data aggregation operations from which communicatively coupled devices may access.

To elaborate, a symbol object instance may be defined by a corresponding template object instance which defines the structure, format, features, and/or properties of a portion of data that has a logical association with the symbol object instance, where the features or properties may be representative of status, identity, analytic capabilities of operating devices, or the like. The symbol object instance may be used to provide symbolic access to global and local data within a product. Template object instances describe the data type of the data referenced by the symbol object instance. The symbol may help expose data of the device in a common and consistent manner, providing relatively less complex consumption of the data as an example benefit of these systems and methods. For example, the symbol may be a vendor specific Common Industrial Protocol (CIP) object or other suitable type of programming-oriented object. A symbol may define, for a particular type of industrial automation device, a set of fields to be populated with data, which may correspond to an instance of the corresponding symbol object instance. For example, a first device having a first device type and a second device having a second device type may be associated with different symbols.

A template object instance may be a data object that is referenced by a symbol object instance. The template (e.g., template object instance) may reference a set of data types aggregated together by a common data structure, which may include any associated nested template object instances (e.g., sub-members) and data types associated with the nested template object instances. Sometimes, templates and/ or corresponding template object instances may include different data types when the corresponding data structure is designed to handle the different data types. Furthermore, the template may be based on a user-defined template that defines a collection of data variables according to a common data structure.

By way of example, control circuitry may use symbolic data operations to access data from the industrial automation device via distributed input/output (IO) products and other connected industrial automation devices. Firmware of the industrial automation device may query a data source, or receive data from a data source based on the symbol, and store the retrieved datasets as instances of templates that correspond to the symbol represented in an industrial automation device. The template and the nature by which the data is stored in the instance of the template may contextualize each data set by using plain-language data labels as opposed to class, instance, and attribute combinations, and the like. The control circuitry may reference the data, the context data associated with the data, or both, when reporting status information associated with the industrial automation device, where the reported status information may be used when determining to perform a control operation.

In some cases, templates and/or template object instances may be nested. When using a template for a particular device, a nested template may be referenced via a symbol object instance of the template for that device. When a symbol includes nested templates and/or formatting for the data, the resulting instances are nested and/or pre-formatted. In this way, a template object instance may describe one or more unique data types/or may include one or more nested template object instances and corresponding data types of the nested template object instances. In each template object instance, associated symbols may inherit a configuration of the corresponding data member of the template, where the configuration inherited may define a data type and placement within a data structure (e.g., data table).

Although the following example environment in which the present embodiments may be implemented is described in terms of an industrial automation application, it should be understood that symbolic data handling and processing systems may also improve operations in other applications. For example, petrochemical applications, burner management applications, gas production applications, mining applications, and/or other heavy industrial applications that incorporate symbolic data operations may enable different components to communicate in a uniform and consistent manner and therefore may benefit from improved reliability and efficiency (e.g., less down time) is desired, as described herein.

By way of introduction, FIG. 1 is a diagrammatic representation of an example industrial automation system 46 that includes a distributed control system 48 (e.g., a "DCS"). The industrial automation system 46 may include any number of industrial components.

Industrial components may include a user interface, the distributed control system 48, a motor drive, a motor, a conveyor, specialized original equipment manufacturer machines, fire suppressant system, and any other device that may enable production or manufacture products or process certain materials. In addition to the aforementioned types of industrial components, the industrial components may also include controllers, input/output (IO) modules, motor control centers, motors, human-machine interfaces (HMIs), user interfaces, contactors, starters, sensors, drives, relays, protection devices, switchgear, compressors, network switches (e.g., Ethernet switches, modular-managed, fixed-managed, service-router, industrial, unmanaged), and the like. The industrial components may also be related to various industrial equipment such as mixers, machine conveyors, tanks, skids, specialized original equipment manufacturer machines, and the like. The industrial components may also be associated with devices used in conjunction with the equipment such as scanners, flow meters, relays, gauges, valves, and the like. In one embodiment, every aspect of the industrial component may be controlled or operated by a single controller (e.g., control system), which may itself be considered an industrial component. In another embodiment, the control and operation of each aspect of the industrial components may be distributed via multiple controllers (e.g., control system).

The industrial automation system 46 may divide logically and physically into different units 50 corresponding to cells, areas, factories, subsystems, or the like of the industrial automation system 46. The industrial components (e.g., load components, processing components) may be used within a unit 50 to perform various operations for the unit 50. The industrial components may be logically and/or physically divided into the units 50 as well to control performance of the various operations for the unit 50.

The distributed control system 48 may include computing devices with communication abilities, processing abilities, controlling abilities, and the like. For example, the distributed control system 48 may include IO modules, relays, sensors, protection devices, switchgear, network switches, processing modules, a control system, a programmable logic controller (PLC), a programmable automation controller (PAC), or any other controller that may monitor, control, and operate an industrial automation device or component. In this way, a motor drive may be considered a device associated with the distributed control system 48 and an industrial component and a motor controlled by the drive may be considered an industrial component.

The distributed control system 48 may be wholly or partially incorporated into one or more physical devices (e.g., the industrial components), wholly or partially implemented as a stand-alone computing device (e.g., general purpose computer), such as a desktop computer, a laptop computer, a tablet computer, a mobile device computing device, or the like. For example, the distributed control system 48 may include many processing devices logically arranged in a hierarchy to implement control operations by disseminating control signals, monitoring operations of the industrial automation system 46, logging data as part of historical tracking operations, and so on. Devices of the distributed control system 48 may convert logical operations or computer commands into mechanical changes implemented via one or more industrial components.

In an example distributed control system 48, different hierarchical levels of devices may correspond to different operations. A first level 52 may include input/output communication modules (IO modules) to interface with industrial components in the unit 50. A second level 54 may include control systems that control components of the first level and/or enable intercommunication between components of the first level 52, even if not communicatively coupled in the first level 52. A third level 56 may include network components, such as network switches, that support availability of a mode of electronic communication between industrial components. A fourth level 58 may include server components, such as application servers, data servers, human-machine interface servers, or the like. The server components may store data as part of these servers that enable industrial automation operations to be monitored and adjusted over time. A fifth level 60 may include computing devices, such as virtual computing devices operated from a server to enable human-machine interaction via an HMI presented via a computing device. It should be understood that levels of the hierarchy are not exhaustive and nonexclusive, and thus devices described in any of the levels may be included in any of the other levels. For example, any of the levels may include some variation of an HMI.

One or more of the levels or components of the distributed control system 48 may use and/or include one or more processing components, including microprocessors (e.g., field programmable gate arrays, digital signal processors, application specific instruction set processors, programmable logic devices, programmable logic controllers), tangible, non-transitory, machine-readable media (e.g., memory such as non-volatile memory, random access memory (RAM), read-only memory (ROM), and so forth. The machine-readable media may collectively store one or more sets of instructions (e.g., algorithms) in computer-readable code form, and may be grouped into applications depending on the type of control performed by the distributed control system 48. In this way, the distributed control system 48 may be application-specific, or general purpose.

Furthermore, portions of the distributed control system 48 may be a or a part of a closed loop control system (e.g., does use feedback for control), an open loop control system (e.g., does not use feedback for control), or may include a combination of both open and closed system components and/or algorithms. Further, in some embodiments, the distributed control system 48 may utilize feed forward inputs. For example, the distributed control system 48 may control flow of a feedstock into a reactor depending on information relating to the feedstock.

As noted above, industrial components may include an HMI. Indeed, the distributed control system 48 may include or couple to one or more HMIs. The distributed control system 48 may represent components of the industrial automation system 46 through visualizations of the components on the display/operator interface. The distributed control system 48 may use data generated by sensors to update visualizations of the components via changing one or more indications of current operations of the components. These sensors may be any device adapted to provide information regarding process conditions. An operator monitoring the industrial automation system 46 may reference the display/operator interface to determine various statuses, states, and/or current operations, such as when adjusting operations of the industrial automation system 46 and/or for a particular component.

Data associated with the industrial automation device, such as data generated by the sensors described above, may be accessed by the distributed control system 48 using symbolic data operations. To improve industrial device operation and to make commissioning and maintenance less complex, it may be desired to enable industrial automation devices to report generated data as symbol and template object instances having common formatting among devices in an industrial automation system and to enable control systems to adjust operations of the industrial automation system based on the data accessed as the symbol and template objects. The symbol/template data access systems and methods described herein may improve industrial automation system operation by reducing an amount of computing resources used to access and identify data associated with the industrial automation device, as well as enable a newly installed industrial automation device to program itself autonomously when communicatively coupled to a control system.

Figure 2:
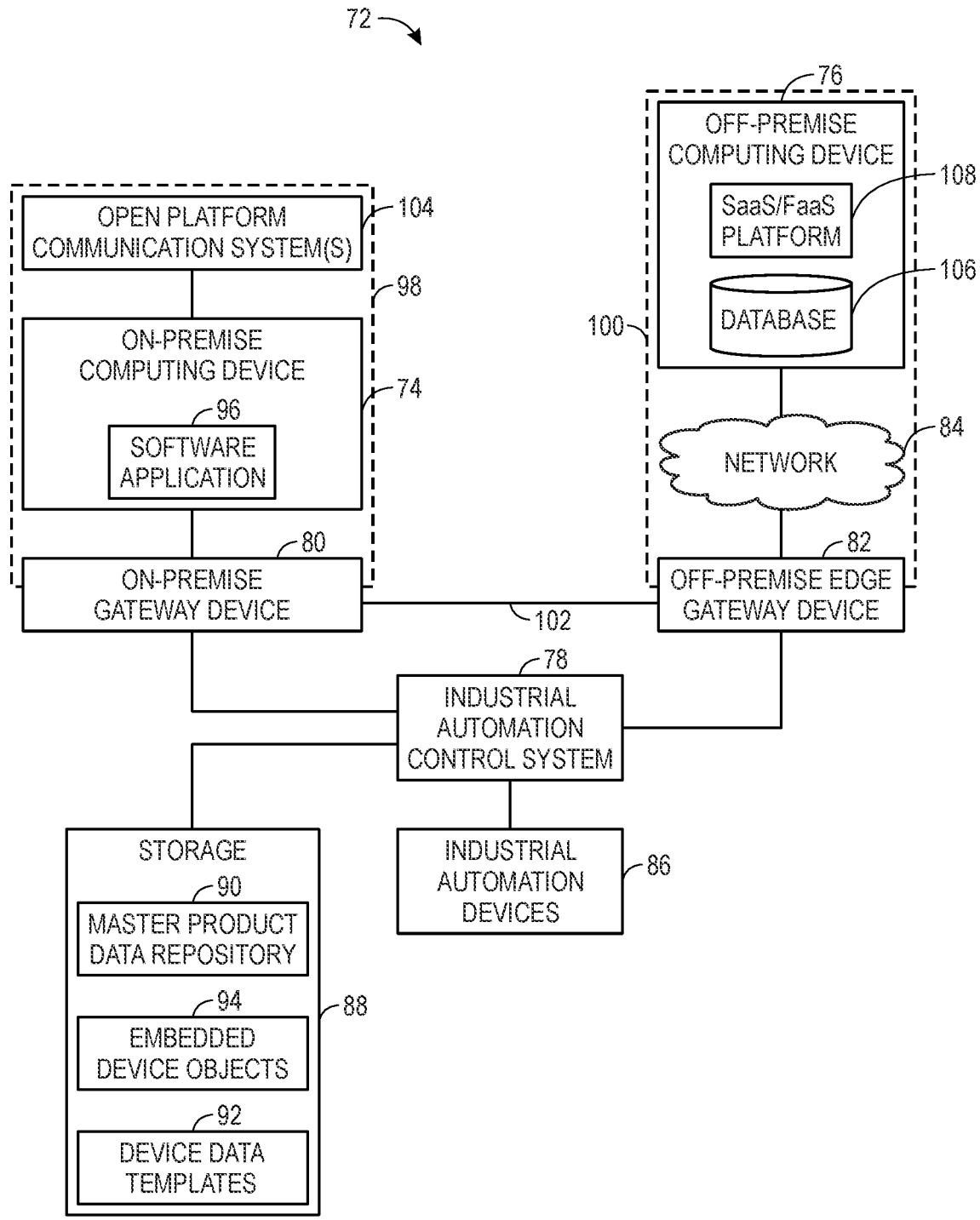
FIG. 2 is a system that includes the industrial automation system of FIG. 1 and off-premise computing devices, in accordance with an embodiment.

To elaborate, FIG. 2 illustrates an example system 72 that includes on-premise computing devices 74, off-premise computing devices 76 and an industrial automation control system 78. The distributed control system 48 described above may include the on-premise computing devices 74, an on-premise gateway device 80, the industrial automation control system 78, and the off-premise edge gateway device 82, where the off-premise edge gateway device 82 may communicate with off-premise computing devices 76 via a network 84. The distributed control system 48 may include industrial automation devices 86 that couple to and/or control connected industrial components to perform operations, such as making products, moving products, turning on, turning off, rotating, or the like. For example, the industrial automation devices 86 may include motor control drives within a motor control center that are coupled to and control operations of one or more motors, one or more fans, or the like.

By way of operation, the industrial automation devices 86 may use symbol-template information models to enable symbol/template data access to the industrial automation control system 78. For example, the industrial automation device 86 may receive data associated with its own operation, classify the received data into a category of symbols, and store the data based on the classified category into a template stored in a respective memory component. In this way, after the symbol object instance is generated with stored data or stored references to additional data, firmware may store the instance in the memory component, in the industrial automation control system 78, or the like, such that it can be accessed later by the industrial automation device 86, another industrial automation device 86, or other devices (e.g., on-premise gateway device 80, off-premise edge gateway device 82).

The on-premise gateway device 80 and the off-premise edge gateway device 82 may be communicatively coupled to each other and to the industrial automation control system 78. Industrial automation devices 86 may generate and report data as symbol and template object instances having common formatting across devices within the system 72 to facilitate processing of the data, storing and handling of the data, and the like. That is, each device in the system 72, such as the on-premise gateway device 80 and/or the off-premise edge gateway device 82, may use symbolic data operations to perform certain tasks. Symbolic data operations may interface with industrial automation control system 78 and/or the industrial automation devices 86 to expose data to other devices, such as the on-premise gateway device 80 and the off-premise edge gateway device 82. The symbolic data operations may be based on representing device data through symbol and template object instances, both of which may be flexible and allow for a device to define its own data model and provide the definition of those models to other (e.g., different) devices.

By way of example, the industrial automation control system 78 may access data from one or more of the industrial automation devices 86 using symbolic data operations enabled by distributed IO products and other connected industrial automation devices. The distributed IO products may include some of the circuitry described with reference to the industrial automation control system 78. Firmware of the industrial automation device 86 may query a data source, or receive data from a data source based on the symbol, and store the retrieved datasets as instances of symbols with data type and formatting derived from template object instances that correspond to the symbol represented in an industrial automation device 86. The data source may be a storage component that the industrial automation device 86 is communicatively coupled to, such as a data repository that receives sensed data from one or more sensors. The industrial automation device 86 may directly receive sensed data from one or more sensors. This data received from the storage component or from the sensor may be stored in, or otherwise associated with, a template dataset to enable symbolic access of the data.

Industrial automation devices 86 able to store associated data into a template dataset associated with a template accessed via symbolic data methods may enhance overall industrial automation system 46 operation. Symbols may integrate at least some of data generated via standard devices and connected devices (e.g., legacy devices without symbolic data compatibility) and data generated via intelligent devices (e.g., devices with symbolic data compatibility) into a consistent format that may be accessed via an information model format that corresponds to the industrial automation system 46. Additional details related to the templates are discussed below at least with reference to FIG. 4. Storage 88 may include a master product data repository 90, device data templates 92, and embedded device objects 94. The storage 88 may be any suitable type of data storage device, such as a database, memory, or the like.

The master product data repository 90 may include product capability profiles, computer-aided design (CAD) models and attributes, digital twin models, augmented reality and/or virtual reality libraries, digital presence content management, persistence models, reporting, graphics, application enablement templates, or the like. The libraries, profiles, models, and so on included in the master product data repository 90 may each reference or operate based on the symbolic data between the master product data repository 90, the industrial automation devices 86, on-premise gateway device 80, off-premise edge gateway device 82, and/or any suitable on- and/or off-premise control and processing systems.

The device data templates 92 may include templates as device data models that may include one or more symbols and/or one or more templates. The device data templates 92 may be considered a template data definition and may indicate how to process and/or characteristics of template data relative to one or more templates and/or one or more symbols. Multiple template object instances may be associated together in one template instance when, for example, a parent device includes multiple nested devices, such as described at least with reference to FIG. 4. The device data templates 92 may harmonize and standardize different data models (e.g., different vendor data models) with awareness of context data for higher level consumption, as described further at least with reference to FIG. 9. Thus, the device data templates 92 may store or associate template object instances, data, and/or context data to each other.

The embedded device objects 94 may correspond to a data structure that associates collections of symbols to a device type. A template may define data types and formatting of data included in the data structure, and the template may be used to decode a set of data associated with the data structure. When registering an industrial automation device 86 to the industrial automation system 46, the industrial automation control system 78 may receive a data structure of the embedded device objects 94 corresponding to a type of the industrial automation device 86. Indeed, as elaborated on in FIG. 8, the industrial automation control system 78 may reference data in a symbol object instance received from the industrial automation device 86, such as identifier data, to match a type of the industrial automation device 86 to one or more of the embedded device objects 94. The industrial automation control system 78 may use the embedded device objects 94 to generate a template instance for the industrial automation device 86 in which future data generated and future contexts received may be populated into by the industrial automation control system 78 and/or by the industrial automation device 86. By using the embedded device object 94 that corresponds to the type of the industrial automation device 86, the industrial automation control system 78 may generate a template object instance consistent in structure with other template object instances generated previously for the same type of industrial automation devices 86.

The embedded device objects 94 may include data structures for logical uses, physical uses, and application uses. For example, data structures of the embedded device objects 94 corresponding to logical uses include flying start templates, motor control templates, variable boost templates, sleep/wake templates, and the like. Expected states that may be included in a template as contextual data for a motor drive include "Running," "Ready," "At Speed," "Active," "At Zero Speed," "Enable On," "Alarmed," "Connected," "Faulted," or the like, as elaborated further on in at least FIGS. 5 and 11. The embedded device objects 94 may correspond to power structure templates, motor data templates, predictive maintenance templates, encoder feedback templates, fan and/or pump templates, conveyor templates, hoist and/or lift/templates, and the like. These templates may be referenced when processing generated data. A template may indicate what data to expect in association with a motor, what data to expect in association with switchgear or power distribution equipment, and the like. In some cases, the embedded device objects 94 may correspond to a unit 50 specific templates.

Data associated with the various device-level systems may be accessed by other components of the industrial automation system 46 via the on-premise gateway device 80. The on-premise gateway device 80 may communicate on networks internal to the industrial automation system 46 with devices within the industrial automation system 46. The on-premise gateway device 80 may be locally connected to one or more industrial automation devices 86, the industrial automation control system 78, or both, and may communicate with the various devices using messages and/or control signals that employ some operational technology (OT) communication schemes, such as the common industrial protocol (CIP). The on-premise gateway device 80 may access symbols stored in the industrial automation devices 86 to process read requests as opposed to waiting to receive identifying information about each device and mapping the identifying information to the requested data for each device to read the requested data. The software application 96 may receive the symbols from the on-premise gateway device 80 and analyze data of the symbols to perform analysis, reporting, historical trending, or the like. The on-premise gateway device 80 may implement control loops based on the symbols and/or may analyze data received via the symbols in real time.

The on-premise gateway device 80 may operate on a logical boundary between the industrial automation control system 78 and an on-premise computing domain 98. The off-premise edge gateway device 82 may operate on a logical boundary between the industrial automation system 46 and an off-premise computing domain 100.

A communicative coupling 102 between the on-premise gateway device 80 and the off-premise edge gateway device 82 may be used to transmit data between the on-premise gateway device 80 and the off-premise edge gateway device 82. The communicative coupling 102 may be disposed within or outside the distributed control system 48. The on-premise gateway device 80 may communicate with one or more on-premise computing devices 74 to receive data from or transmit data to the software applications 96 executed by the on-premise computing device 74 and/or platform 104 provided via the on-premise computing device 74. Communications routed via the communicative coupling 102 may be afforded relatively lower transmission delays, different authentication operations, quicker processing, and thus lower consumption of computing resources, than communications between the on-premise gateway device 80 and the off-premise edge gateway device 82 routed through the industrial automation control system 78. Similarly, communications routed from the off-premise edge gateway device 82 to the industrial automation control system 78 may have different authentication operations than authentication operations used for communications routed from the on-premise gateway device 80 to the industrial automation control system 78. Furthermore, separating devices into different levels, as visualized in FIG. 1 but also as suggested in FIG. 2 with the differences between a domain including the industrial automation control system 78 and the on-premise computing domain 98, may have the additional improvement of selective deployment of authentication operations and security provisions.

The off-premise edge gateway device 82 may access data of the industrial automation devices 86 via communication with the industrial automation control system 78 and/or via communication with the on-premise gateway device 80. For example, the off-premise edge gateway device 82 may access templated data via the on-premise gateway device 80 by way of reference through one or more symbol object instances. As such, the off-premise edge gateway device 82 may acquire data from the industrial automation devices 86 using the same symbol object instances used by the on-premise gateway device 80. As a result, the off-premise edge gateway device 82 may connect to the on-premise gateway device 80 via the communicative coupling 102. The off-premise edge gateway device 82 may provide the acquired template data to software applications outside the industrial automation system 46, such as the SaaS/FaaS platform 108 executed on the off-premise computing device 76. The software applications outside of the industrial automation system 46 may then perform real time analysis of the template data within the industrial automation device 86 that has been indirectly acquired via the off-premise edge gateway device 82.

Data generated by the on-premise gateway device 80, the on-premise computing device 74, the off-premise edge gateway device 82, and/or the off-premise computing device 76 may be exchanged among the system 72 to perform additional historical data logging, additional analysis, perform security operations (e.g., authenticating a user), or the like. Template data stored in one or more industrial automation devices 86 and/or in the industrial automation control system 78 may be directly accessed via reference to a combination of a template object instance and a symbol object instance, such as [template object instance].[symbol object instance]. To access the template data, the off-premise edge gateway device 82, the on-premise gateway device 80, or both, may directly access data of the industrial automation control system 78 and/or of the industrial automation devices 86 via reference to the template object instance and the symbol object instance. In some cases, the off-premise edge gateway device 82 may instantiate a client on the on-premise gateway device 80 to access template data via the on-premise gateway device 80, as described further in reference to FIG. 11. In this way, the client may improve exchange of data between the industrial automation device and the off-premise edge gateway device. For example, the client may enable the off-premise gateway device to directly subscribe to information provided by or stored within the industrial automation device 86, which may reduce an amount of time to communicate data between the gateway devices 80, 82 and/or reduce a number of computing resources used to map generated data to the off-premise edge gateway device 82.

After obtaining the data from the industrial automation device 86, the off-premise computing device 76 and/or the on-premise computing device 74 may log the data in real time to perform historical trending and analysis of the data over time. The off-premise computing device 76 and/or the on-premise computing device 74 may analyze the stored data over time. This process may involve historical trending of the data logged over time. The off-premise edge gateway device 82 may communicate via the network 84 to access a software application and/or to log the data in a database 106.

As one example, the off-premise computing device 76 may provide a software-as-a-service and/or a Function as a Service (SaaS/FaaS) platform 108 via the network 84. The database 106 may include any suitable storage device, server, or the like, such as a web server (e.g., a unitary Apache installation), an application server (e.g., unitary JAVA Virtual Machine), and/or a database server (e.g., a unitary relational database management system (RDBMS) catalog). The platform 108 provided by the off-premise edge gateway device 82 may include platforms such as THING-WORX® registered trademark of PTC, Inc., AZURE® registered trademark of Microsoft Corporation, FIIX® registered trademark of Fiix, Inc., INFLUXDB® registered trademark of InfluxData, Inc. or the like. The platform 108 may manage data stored in the database 106 based on data received from the off-premise edge gateway device 82. In some cases, the off-premise computing device 76 may correspond to one or more data centers that may include one or more servers, one or more virtual servers, or the like, that each may be operated on one or more physical computing devices. The network 84 may be any suitable wired or wireless network, such as a network enabled by the Internet or a cloud-based network. The network 84 may be an off-premise network used by the off-premise computing device 76 to transmit data to the off-premise edge gateway device 82. Using this information, the network 84 may route data and instructions between the off-premise computing device 76, database 106, and the off-premise edge gateway device 82. The off-premise edge gateway device 82 may have access to network information used to communicate with the industrial automation control system 78 and/or the on-premise gateway device 80, such as corresponding internet protocol (IP) address, uniform resource locators (URLs), or the like. In some cases, the off-premise edge gateway device 82 may be disposed on-premise of the industrial automation system 46 and be owned by a same entity who owns the on-premise gateway device 80 and have connectivity to the network 84.

As described above, industrial automation-related systems and methods that use symbolic data operations may enable industrial automation device 86 reporting and control even among systems that use different communication formats. The symbolic data operations may involve the industrial automation control system 78, the on-premise gateway device 80, and the off-premise edge gateway device 82 accessing data associated with the one or more industrial automation devices 86 through symbols.

Figure 3:
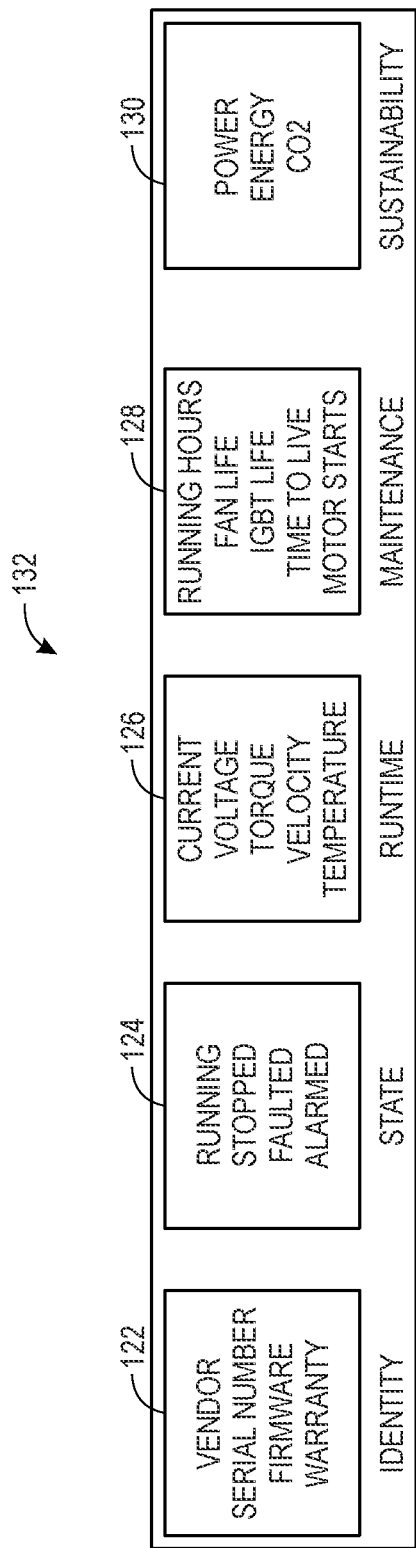
FIG. 3 is a block diagram of example symbols used for the industrial automation system of FIG. 1, in accordance with an embodiment.

To elaborate further on symbolic data-based operations, FIG. 3 is a block diagram illustrating example categories of symbols that may be associated with the industrial automation system 46 that may be included with the device data templates 92. Here, the categories correspond to an Identity category 122, a State category 124, a Runtime category 126, a Maintenance category 128 (e.g., preventive maintenance), and a Sustainability category 130. It should be understood that other different and/or additional categories, or combination of categories may be used, including fewer categories than those listed are contemplated. The various categories 122-130 may characterize a referenced template dataset from objects (e.g., symbol object instances, template object instances) without being an object itself. The characterization of a template dataset or a symbol object instance into a category of the categories 122-130 may be inherited from a template.

One or more of the industrial automation devices 86 may use symbol-template models to enable symbol/template data access to control systems or interfacing devices, such as the industrial automation control system 78, the on-premise gateway device 80, and/or the off-premise edge gateway device 82. For example, the industrial automation device 86 may receive data associated with its own operation, process the received data to determine a category of a symbol within a template instance of the symbol, and store the data based on the determined category into template data stored in some memory component.

To elaborate further, each of the categories may correspond to different templates 132 for different data. For example, when being used to describe the industrial automation device 86, the Identity category 122 may correspond to symbol objects instances referencing vendor identifier data that indicates the vendor from which the industrial automation device 86 was purchased. The Identity category 122 may correspond to symbol object instances referencing serial number data of the industrial automation device 86 and/or firmware loaded onto the industrial automation device 86. In some cases, the Identity category 122 may correspond to symbol object instances referencing warranty information data of the industrial automation device 86, such as characteristics of a warranty that is active, a term remaining on the warranty, whether or not the warranty has been redeemed and thus is not active, or the like. This reference to warranty information may be made at the third level 56 by the industrial automation control system 78, or another relatively higher level control system communicatively coupled to industrial automation devices, as opposed to the industrial automation device 86

Other categories include a State category 124, a Runtime category 126, a Maintenance category 128, and a Sustainability category 130. The State category 124 may correspond to symbol object instances referencing present state data of the industrial automation device 86 (or at least a state of the industrial automation device 86 at a time of most recent reporting), where different examples of potential states include "running," "stopped," "faulted," and "alarmed." Other states may be used for different types of industrial automation devices 86. The Runtime category 126 may correspond to symbol object instances referencing present operating parameter data, such as data collected during runtime. For example, the Runtime category 126 may correspond to symbol object instances referencing current data (e.g., in Amps) of the industrial automation device 86, voltage data of the industrial automation device 86, torque data of the industrial automation device 86, velocity data of the industrial automation device 86, and/or temperature data of the industrial automation device 86, or any suitable combination of measureable parameters. The Maintenance category 128 may correspond to symbol object instances referencing data related to predictive maintenance metrics of the industrial automation device 86. For example, the Maintenance category 128 may correspond to symbol object instances referencing data indicative of a number of running hours of the industrial automation device 86, to data indicative of an expected fan life remaining of a fan of the industrial automation device 86, to data indicative of an expected hardware component (e.g., IGBT) life of the industrial automation device 86, to data indicative of a time remaining to live metric of the industrial automation device 86, and/or to data indicative of a count of a total number of motor starts performed over time for the industrial automation device 86. These values together or alone may help quantify (e.g., quantifies) an amount of operational time remaining of the industrial automation device 86. The Sustainability category 130 may correspond to symbol object instances referencing data indicative of environmental metrics, such as data used in or useful in internal compliance reporting or governmental entity compliance reporting. For example, the Sustainability category 130 may correspond to symbol object instances referencing present power consumption data, present energy consumption data, historical power consumption data, historical energy consumption data, historical emissions metric data, and/or present emissions metric data, such as data indicating an amount of carbon dioxide ($CO_2$) generated for a duration of time (e.g., the device life so far).

Firmware may store a template object instance in memory, such as with the device data templates 92 in the storage 88. After being stored in a memory, the template object instance may be accessed later by one of the industrial automation devices 86, the on-premise gateway device 80, the off-premise edge gateway device 82, and/or a control system (e.g., industrial automation control system 78) and used to decode a dataset also being accessed by that device (e.g., the industrial automation device 86, the on-premise gateway device 80, the off-premise edge gateway device 82, the industrial automation control system 78).

Figure 4:
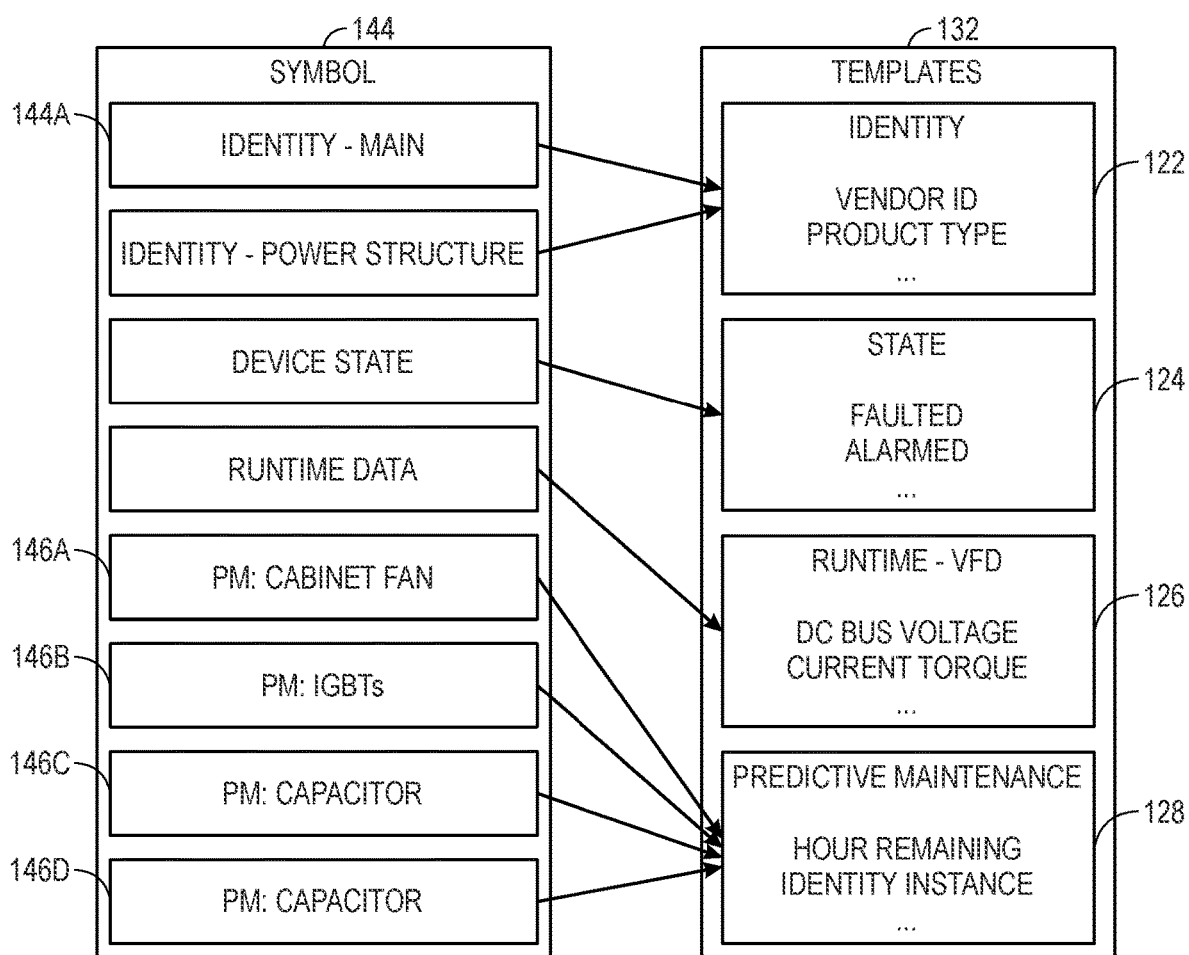
FIG. 4 is a block diagram of example templates and symbols stored in firmware of one or more industrial automation devices of the industrial automation system of FIG. 1, in accordance with an embodiment.

To elaborate, FIG. 4 is a block diagram of example templates 132 and symbols 144 stored in firmware of an industrial automation device 86. By using templates 132 and symbols 144, references to the data may be made directly to a template dataset of a particular industrial automation device as opposed to traditional class, instance, and attribute (CIA) lookup operations, yielding relatively more efficient method of data processing while also reducing computing resources that may be used to perform the CIA lookup operations. Moreover, these symbolic data operations may further improve control system operations by standardizing systems and methods used to access data generated by industrial automation devices 86, making it easier to access the data when commissioning one or more devices, updating a process of the industrial automation system 46, or the like.

A template 132 may provide the description of an individual data model, including all members and their data types (and templates can contain other template object instances) for that respective industrial automation device 86. A symbol 144 may be a data object defined by a corresponding template object that includes other features or properties related to the data object that represents status, identity, and/or analytic capabilities of one or more related operating devices. For example, symbol "144A" corresponding to a primary identity of the industrial automation device 86 (e.g., "identity—main", Main object 144A) may be defined by a corresponding template Identity category 122. The reference numbers "132" and "144" are used herein to refer generally to templates and symbols and not necessarily to the exact template and symbol in FIG. 4. In other words, the template 132 and symbol 144 of FIG. 4 may be for a specific motor drive application and the same template 132 and symbol 144 may be used in different applications, as well as for different nested devices.

Instances of the templates 132 may organize data associated with the different industrial automation devices 86 into different categories of symbols 144 as different array elements. The different categories of symbols 144 may also include sub-categories of symbols 144. When a template instance includes a nested symbol sub-category, the symbol 144 of a parent template instance may reference a nested template instance, and thus the array element for the symbol 144 may include information indicative of the nested template instance to redirect to reference the second template instance.

In some embodiments, the template 132 may be associated with symbols 144 to enable symbolic access to global-level data and local-level data associated with an industrial automation device. Symbols 144 may be one instantiation of a template object instance and correspond to array elements to organize data or references to additional nested templates. Multiple symbols 144 can be referenced by the same template instance, such as, for example, each predictive maintenance symbol 146 (e.g., symbol 146A, symbol 146B, symbol 146C, and symbol 146D) in the diagram may reference the same Maintenance category 128 (e.g., predictive maintenance (PM) template object). The symbols 144 and the template 132 may be a vendor specific common industry protocol (CIP) object.

The templates 132 may describe the data type of the data being referenced via the symbols 144 and may reference template object instances as their described data type. Indeed, one or more of the symbols 144 may include additional references to additional nested sub-categories, which may be grouped as part of a nested template to enable a common reference to the group of sub-category symbols. One or more of the templates 132 may include, as elements of an array data structure, symbols 144 storing data and/or symbols 144 referencing another template, such as the Maintenance category 128 that includes symbol objects 146A-D. For example, any template referenced via a capacitor symbol 146D (e.g., "PM: Capacitor") is a nested template of the Maintenance category 128. When a template 132 includes nested templates and/or formatting for the data, the instances that result may be nested and/or pre-formatted too. In this way, each instance of the template 132 may include an object that describes one or more unique data types and each instance of the template 132 may include one or more sub-members and corresponding data types of the sub-members.

Each instance of the template 132 allocates memory in a consistent manner between different devices to help standardize data access. The instances may allocate memory according to the different categories of data able to be stored within the instance. The templates 132 may be shared across an enterprise product offering via the device data templates 92, thereby providing control circuitry consistent and uniform access to the stored data according to its classification.

For example, memory may be allocated in a manner that enables the on-premise gateway device 80, the off-premise edge gateway device 82, the industrial automation devices 86, and/or the industrial automation control system 78 to similarly access, handle, and analyze data associated with the industrial automation system 46. In some cases, the industrial automation control system 78 may be an intermediary between the industrial automation device 86 and another device, such as the on-premise gateway device 80 and/or the off-premise edge gateway device 82, to convert the data into a format interpretable by the destination device. For example, the industrial automation control system 78 may include one or more intermediary control systems in the different units 50 to aggregate or process data generated by industrial automation devices 86.

When a parent device (e.g., the device represented via the symbols 144 of FIG. 1 and identified via the Identity—Main symbol 144A) has nested devices, such as an associated fan, an associated capacitor, a contactor, and an insulated-gate bipolar transistor assembly (IGBT), then the nested devices may also be represented as symbols 144. For example, the nested devices are included as symbols 144A-D associated with the Maintenance category 128. In other systems, the nested devices could also be included as symbols 144 associated with the Identity category 122, the State category 124, and/or the Runtime category 126. Different systems may be monitored at a higher, parent-device level or at a lower, a nested-device level, or both. There may be tradeoffs between computing resource consumption to process additional symbols for the nested devices and the capability of debugging undesired operations and/or predicting future maintenance needs.

Industrial components designed to incorporate symbolic data operations may thus have the additional technical improvement of being able to have sub-component template structures nested under the parent's device template structure, leading to an enhanced representative data structure that enables the parent device to self-report its nested devices when initially installed into the industrial automation system and when the nested devices are reporting data. Having the parent device self-report nested devices may improve operational reliability and reduce downtime by reducing a likelihood of operator error and making maintenance operations and installation operations more efficient by reducing a number of control commands used to install a device into an industrial automation system, thereby reducing computing resources consumed to do so.

Figure 5:
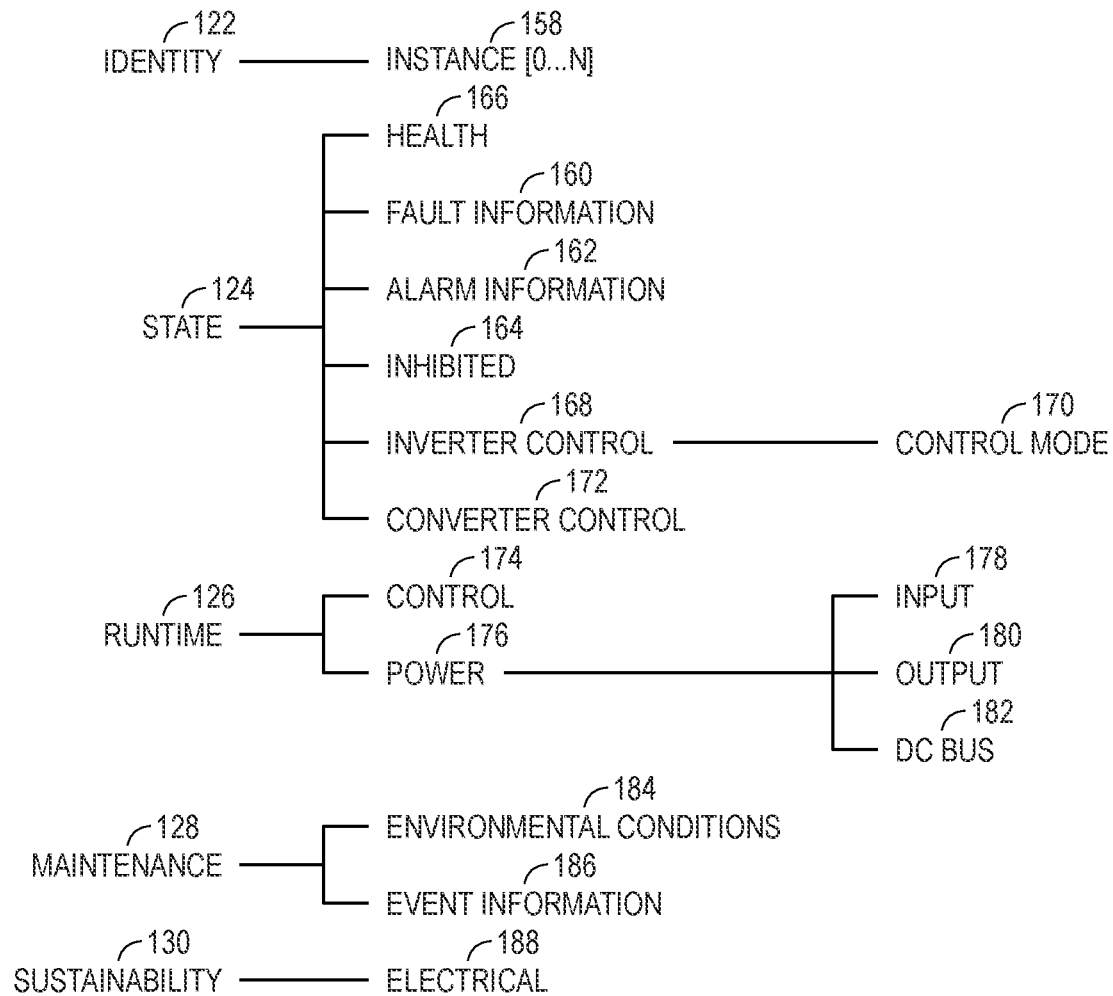
FIG. 5 is a diagram of an example data model hierarchy that includes categories and sub-categories associated with the templates and symbols of FIG. 4, in accordance with an embodiment.

To aid in visualizing the nested templates, FIG. 5 is a diagram of an example data model hierarchy that includes categories and sub-categories associated with the symbols 144 and the template 132 of FIG. 4. It is noted that these are examples of categories and additional or fewer categories may be used, including additional types of categories (e.g., categories to show temperature information or other sensing data). Here, the categories correspond to an Identity category 122, a State category 124, a Runtime category 126, a Maintenance category 128 (e.g., preventive maintenance), and a Sustainability category 130. It should be understood that any suitable category or combination of categories may be used. As described above with reference to FIGS. 3 and 4, each of the categories correspond to different template objects that may store different data.

The Identity category 122 of templates may correspond an Identity object instance array 158 (e.g., an Identity.Instance [0-n] template object instance array) as the Identity—Main symbol 144A. The Identity object instance array 158 correspond to an array where each array element represents a different product available through the same IP address of the parent industrial automation device 86, here being the parent motor drive.

The State category 124 may correspond to a Fault Information symbol 160, an Alarm Information symbol 162, an Inhibited symbol 164, a Health symbol 166, an Inverter Control symbol 168, which includes its own nested Control Mode symbol 170, and a Converter Control symbol 172. The industrial automation device 86 may report state data for two nested devices associated with the State category 124—a power inverter via the Inverter Control symbol 168 and a power converter via the Converter Control symbol 172.

Tables 1-14 help to elaborate further on these sub-categories and the data referenced via template object instances and/or symbols object instances. It is noted that some data generated during industrial automation device 86 operation may be output values subject to fluctuation between sample periods. These values may be read from devices with a pre-defined sample rating according to a subscription service, which may provide firmware of the industrial automation device 86 periodic reporting according to the sample rating. A moving window average (MWA) filter may be applied to the values to provide a subset of values for these variables over time and is shown as a blank column in the Tables 1-14. The MWA column and the time stamp column may be filled in during an actual operation with data representative of a moving window average for that corresponding value and a timestamp of when the value was last updated. As described herein, Tables 1-14 show different examples of templates which may be saved into device storage as template object instances.

Table 1 shows example template data that the Identity object instance array 158 (e.g., Identity.Instance[0-n]) may reference. Indeed, the Identity object instance array 158 may be a nested template. In Table 1, Identity Attribute number 5 corresponds to null data. When a template is included and unused due to the particular type of device, the template may include null references, which may help to maintain the consistent data structure between different industrial automation devices. By omitting null references and unused templates from the firmware of a respective industrial automation device, references between the control systems and the respective industrial automation device may be incorrect, incomplete, and difficult to manage in batch control operations. By retaining null references, control operations may be processed in batch by the control system, enabling same commands to be used between different devices without resulting in runtime errors from potentially incomplete references.

Figure 12:
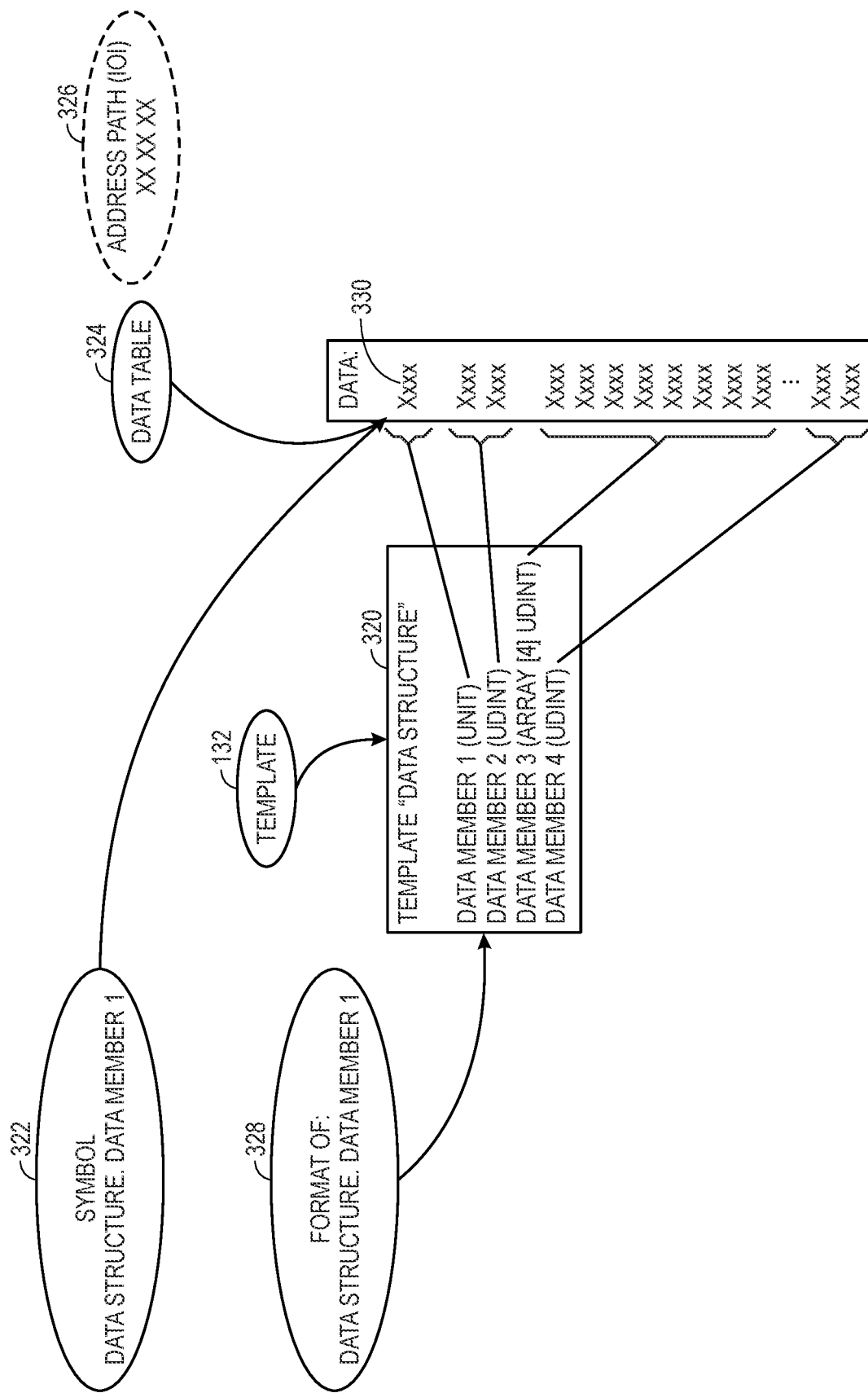
FIG. 12 is a diagrammatic representation of example symbolic data structures, in accordance with an embodiment.

The Identity object instance array 158 may correspond to one or more attributes (e.g., Identity Attributes 1-7 in Table 1), which may be the same as the one or more data members visually represented as part of the template object instance 320 of FIG. 12. A first Identity Attribute (e.g., a first data member as shown in the example of FIG. 12), Vendor Identifier (ID), may have the data type of Unsigned Integer (16 bits) ("UINT") and correspond to one or more numbers that identify a vendor of the industrial automation device. For example, the Vendor ID may equal "1" and represent Allen-Bradley. A second Identity Attribute, Device Type may have the data type of UINT and indicate to one or more numbers that correspond to a type of the industrial automation device. A third Identity Attribute, Product Code, may have the data type of UINT and indicate to one or more numbers that correspond to a product name and rating of the industrial automation device. A fourth Identity Attribute, Firmware Revision, may have the data type of UINT and indicate to one or more numbers that correspond to a product firmware revision of the industrial automation device. A fifth Identity Attribute may be reserved for future use. A sixth Identity Attribute, Serial Number, may have a data type of Unsigned Double Integer (32 bits) ("UDINT") and indicate a serial number or a unique 32-bit number that particularly corresponds to the industrial automation device. A seventh Identity Attribute, Product Name, may have the data type of American Standard Code for Information Interchange (ASCII) characters (4 bits each with a maximum of 64) ("SHORT_STRING") and may indicate a product name and rating of the industrial automation device.

TABLE 1

Identity.Instance[0-n] Table

| Identity Attribute number | Elements | Data Type | MWA | Time Stamp | Description |
|---|---|---|---|---|---|
| [1] | Vendor ID | UINT | | | 1 = Allen-Bradley |
| [2] | Device Type | UINT | | | 142 |
| [3] | Product Code | UINT | | | Number identifying product name and rating |
| [4] | Firmware Revision | UINT | | | Number identifying product firmware version |
| [5] | [null] | [null] | | | Reserved for future use |
| [6] | Serial Number | UDINT | | | Unique 32-bit number |
| [7] | Product Name | SHORT_STRING | | | Product name and rating |

Figure 8:
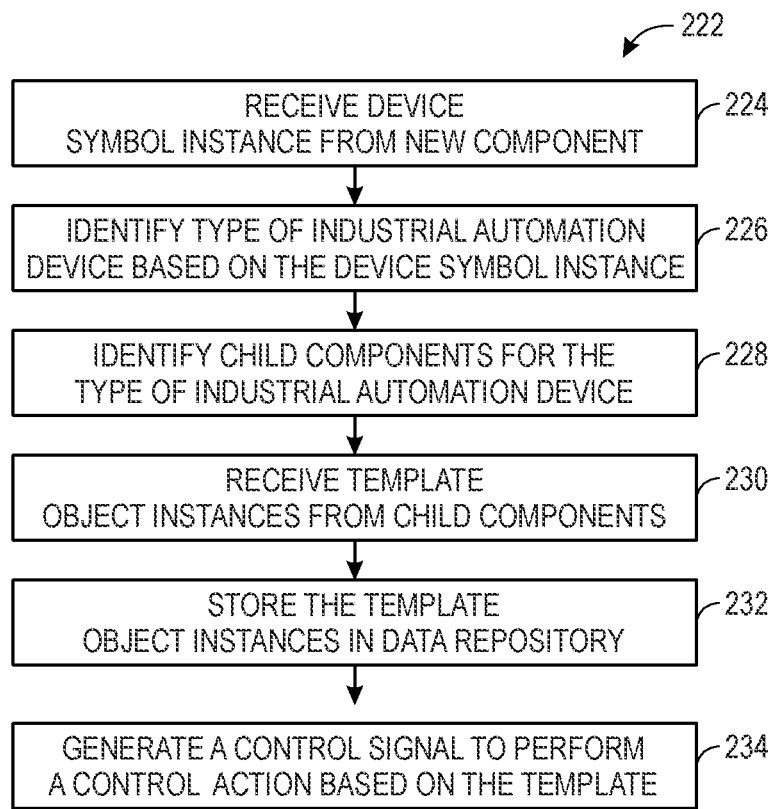
FIG. 8 is a flow diagram of a process for operating the industrial automation control system to register a newly installed industrial automation device, in accordance with an embodiment.

The Identity object instance array 158 may be one example of several possible instances included in the firmware of the industrial automation device 86 of FIG. 8. For example, Tables 2-7 show example templates used for the State category 124, which may include multiple nested symbols corresponding to instances of various related templates. The State category 124 may correspond to the following symbols: Health symbol 166; Fault Information symbol 160; Alarm Information symbol 162; Inhibited symbol 164; Inverter Control symbol 168; and Converter Control symbol 172. For ease of reference, the instance numbers (e.g., Instance[0-n]) are omitted and it is noted that the instance numbers may be similar for the other templates as discussed above for the Identity object instance array 158.

Table 2 shows an example template for respective State.Health instances that may be referenced by the Health symbol 166. The template includes data having a data type of Boolean (1 bit) ("BOOL"). The data included in the template corresponds to Faulted, Alarmed, Ready, and Owned.

The Faulted data indicates when none of the instances of the device (e.g., instances of FIG. 1 corresponding to the nested components of the motor drive) are in a faulted state. In the example of a motor drive as a device, it has no converter or inverter faults. The Faulted data may be an Identity Object, Attribute 5 that informs fault state for all device instances. In some cases, Bit 8 may indicate a minor recoverable fault and Bit 10 may indicate a major recoverable fault.

The Alarmed data indicates when none of the instances of the device (e.g., instances of FIG. 8 corresponding to the nested components of the motor drive) are in an alarmed state. In the example of a motor drive as a device, it has no converter or inverter active alarms or any user configurable active alarm.

The Ready data indicates when the device is ready to operate and there are no faults. In the example of a motor drive as a device, it has no faults and no start inhibit condition present in the converter or inverter.

The Owned data indicates when the device is owned by the control system. In the example of a motor drive as a device, an Identity Object corresponding to the Owned data array element may have an Attribute 5 able to inform the parent device's (e.g., motor drive's) owned state to each of the nested devices corresponding to the different nested device instances. The Owned data may use a Bit 0 to indicate its state as Owned.

TABLE 2

State.Heath Template Table

| Elements | Data Type | MWA | Time Stamp | Description |
|---|---|---|---|---|
| Faulted | BOOL | | | None of the instances of the device are in a faulted state. In the example of a drive as a device, it has no converter or inverter faults. Identity Object, Attribute 5 informs fault state for all device instances. Bit 8 = Minor recoverable fault Bit 10 = Major recoverable fault |
| Alarmed | BOOL | | | None of the instances of the device are in an alarmed state. In the example of a drive as a device, it has no converter or inverter active alarms or any user configurable active alarm. |
| Ready | BOOL | | | Device is ready to operate, there are no faults. In the example of a drive as a device, it has no faults and no start inhibit condition present in the converter or inverter. |
| Owned | BOOL | | | Owned by the Controller Identity Object, Attribute 5 informs owned state for all device instances. Bit 0 = Owned |

Table 3 shows an example template used for a state fault information instance that may be referenced by the Fault Information symbol 160. The template may include data having a data type of ASCII characters (8 bits each) ("STRING"). The data included in the template corresponds to the four most recently recorded faults. Any number of faults may be recorded in the state fault information template. The industrial automation control system 78 owning the industrial automation device 86 may perform additional recording operations that may make additional recording at the device level moot or duplicate. When a fault is recorded, a string may be stored in relationship to the related State.FaultInformation instance that indicates a Fault code, a Sequence ID, a Status (e.g., Active or Inactive), an International Fault Text (e.g., Text describing the fault with support for Unicode), an Instance Number (or Port Number), and/or an Instance Name (drive or option module name), or the like. This information may change between recorded faults in the instance. When referenced, the Fault String data corresponds to a "property bag." A property bag data structure may, when referenced, return a long string data type where each property of the event is separated by commas). The property bag may then be subsequently parsed to have each property separated from the property bag, such as by the owning control system to process the fault information.

TABLE 3

State.FaultInformation Table

| Elements | Data Type | MWA | Time Stamp | Description |
|---|---|---|---|---|
| Fault String 0 | STRING | | | Fault code, Sequence ID, Status (Active or Inactive), International |

TABLE 3-continued

State.FaultInformation Table

| Elements | Data Type | MWA | Time Stamp | Description |
|---|---|---|---|---|
| Fault String 1 | STRING | | | Fault Text (Text describing the fault with support for Unicode), Instance Number (or Port Number), Instance Name (drive or option module name) |
| Fault String 2 | STRING | | | Fault code, Sequence ID, Status (Active or Inactive), International Fault Text (Text describing the fault with support for Unicode), Instance Number (or Port Number), Instance Name (drive or option module name) |
| Fault String 3 | STRING | | | Fault code, Sequence ID, Status (Active or Inactive), International Fault Text (Text describing the fault with support for Unicode), Instance Number (or Port Number), Instance Name (drive or option module name) |

Table 4 shows an example template used for a state alarm information instance that may be referenced by the Alarm Information symbol 162. The template includes data having a data type of ASCII characters (8 bits each) ("STRING"). The data included in the template corresponds to the four most recently recorded alarms for the industrial automation device and/or for any of the device's nested devices. Any number of alarms may be recorded in the state alarm information template. The control system owning the industrial automation device may perform additional recording operations that may make additional recording at the device level moot or duplicate. When an alarm is recorded, a string is stored in relationship to the related State.AlarmInformation instance that indicates an Alarm code, a Sequence ID, a Status (e.g., Active or Inactive), an Alarm Type (e.g., 01—value crossed threshold to alarm or 02—configuration Inhibit), an International Alarm Text (e.g., Text describing the alarm with support for Unicode), an Instance Number (or Port Number), and/or an Instance Name (drive or option module name), or the like. This information may change between recorded alarms in the instance. When referenced, the Alarm String data corresponds to a property bag. The owning control system may subsequently parse a referenced property bag to access the different alarm properties separate from the property bag. The Sequence ID is a DINT (−2147483648 to 2147483647) that increment each time an alarm is generated and, therefore, creates a unique number over a long period of time. This scheme allows the information system to distinguish a sequence of events. The other elements of the alarm information are available in the CIP Alarm object (0x98 hex). Alarm Information informs the last four alarms of the device, where: Alarm String 0 corresponds to a 01st most recent alarm, Alarm String 1 corresponds to a 02nd most recent alarm, Alarm String 2 corresponds to a 03rd most recent alarm, and Alarm String 3 corresponds to a 04th most recent alarm.

TABLE 4

State.AlarmInformation Table

| Elements | Data Type | MWA | Time Stamp | Description |
|---|---|---|---|---|
| Alarm String 0 | STRING | | | Alarm code, Sequence ID, Status (Active or Inactive), Alarm Type (01 - value closet to alarm or 02 - configuration Inhibit), International Alarm Text (Text describing the alarm with support for Unicode), Instance Number (or Port Number), Instance Name (drive or option module name) |
| Alarm String 1 | STRING | | | Alarm code, Sequence ID, Status (Active or Inactive), Alarm Type (01 - value closet to alarm or 02 - configuration Inhibit), International Alarm Text (Text describing the alarm with support for Unicode), Instance Number (or Port Number), Instance Name (drive or option module name) |

TABLE 4-continued

State.AlarmInformation Table

| Elements | Data Type | MWA | Time Stamp | Description |
|---|---|---|---|---|
| Alarm String 2 | STRING | | | Alarm code, Sequence ID, Status (Active or Inactive), Alarm Type (01 - value closet to alarm or 02 - configuration Inhibit), International Alarm Text (Text describing the alarm with support for Unicode), Instance Number (or Port Number), Instance Name (drive or option module name) |
| Alarm String 3 | STRING | | | Alarm code, Sequence ID, Status (Active or Inactive), Alarm Type (01 - value closet to alarm or 02 - configuration Inhibit), International Alarm Text (Text describing the alarm with support for Unicode), Instance Number (or Port Number), Instance Name (drive or option module name) |

Table 5 shows an example nested template used for a state inhibited information that may be referenced by the Inhibited symbol 164. The template includes data having a data type of ASCII characters (4 bits each) ("STRING"). The data included in the template corresponds to the last four inhibited description for the device for the industrial automation device 86 and/or for any of the device's nested devices. Any number of inhibit reasons may be recorded in the state inhibited template. In some cases, the Inhibited description applies only to the industrial automation device 86. A fault or an alarm does not constitute an inhibited reason, and local processing circuitry of the industrial automation device 86 may generate an inhibited signal to prevent the drive from start in response to a condition (e.g., reason for inhibited operation as indicated via the inhibited reason data). The industrial automation control system 78 owning the industrial automation device 86 may perform additional recording operations that may make additional recording at the device level moot or duplicate. When an inhibit reason is recorded, a string is stored in relationship to the related State.Inhibited template that indicates a Sequence ID, an International Text (e.g., Text describing the inhibit reason with support for Unicode), or the like. This information may change between recorded inhibited strings in the instance. When referenced, the inhibited string data corresponds to a property bag. The industrial automation control system 78 may subsequently parse a referenced property bag to access the different alarm properties separate from the property bag. The Sequence ID is a DINT (−2147483648 to 2147483647) that increment each time an alarm is generated and, therefore, creates a unique number over a long period of time. This may permit the industrial automation control system 78 to distinguish a sequence of events. The Inhibited template may inform the last four inhibit reasons of the device, where: Inhibited String 0 corresponds to a 1st most recent, Inhibited String 1 corresponds to a 2nd most recent, Inhibited String 2 corresponds to a 3rd most recent, and Inhibited String 3 corresponds to a 4th most recent.

TABLE 5

State.Inhibited Table

| Elements | Data Type | MWA | Time Stamp | Description |
|---|---|---|---|---|
| Inhibited String 0 | STRING | | | Sequence ID, International Text (Text describing the inhibit reason with support for Unicode) |
| Inhibited String 1 | STRING | | | Sequence ID, International Text (Text describing the inhibit reason with support for Unicode) |
| Inhibited String 2 | STRING | | | Sequence ID, International Text (Text describing the inhibit reason with support for Unicode) |
| Inhibited String 3 | STRING | | | Sequence ID, International Text (Text describing the inhibit reason with support for Unicode) |

The industrial automation device 86 may include an inverter corresponding to one of the instances. An inverter instance parent template may include multiple sub-categories symbols that reference different nested templates. These sub-categories may include Inverter Control Motor Status nested template (e.g., Table 6) and Control Mode nested template (Table 7).

Table 6 shows an example template used for a state inverter control motor status that may be referenced by the Inverter Control symbol 168. The template includes data having a data type of Boolean (1 bit) ("BOOL"). The data included in the template corresponds to "Running," "Ready," "At Speed," "Active," "At Zero Speed," "Enable On," and any suitable data may be included in the template. This may be an example where the states included in the template data are based on a template of states stored as part of the embedded device objects 94. Each of these statuses, in a motor drive example, may correspond to a motor-side status. For other industrial automation devices, these statuses may correspond to device loads or downstream statuses.

The Running data may indicate the motor side inverter is modulating in response to a start or run command. This bit may clear in the following conditions: drive stopped, drive coast stop, drive jogging, and drive autotuning (bit 16). The Ready data may indicate there are no start inhibits (bit 0). The At Speed data may indicate an output frequency is within 1% of the velocity reference (bit 8). The Active data may indicate a motor side inverter is modulating (bit 1). The At Zero Speed data may indicate the motor side inverter is operating at zero speed (within the Zero Speed limit—bit 24). The Enable On data may indicate an Enable input for the motor side inverter is closed or set (bit 29).

TABLE 6

State.InverterControl.Motor Status Table

| Elements | Data Type | MWA | Time Stamp | Description |
|---|---|---|---|---|
| Running | BOOL | | | Motor Side Status - indicates the motor side inverter is modulating in response to a start or run command. This bit clears in the following conditions: drive stopped, drive coast stop, drive jogging, and drive autotuning (bit 16). |
| Ready | BOOL | | | Motor Side Status - indicates there are no start inhibits (bit 0). |
| At Speed | BOOL | | | Motor Side Status - indicates output frequency is within 1% of the velocity reference (bit 8). |
| Active | BOOL | | | Motor Side Status - indicates the motor side inverter is modulating (bit 1). |
| At Zero Speed | BOOL | | | Motor Side Status - indicates the motor side inverter is operating at zero speed (within the Zero Speed limit - bit 24). |
| Enable On | BOOL | | | Motor Side Status - indicates the Enable input for the motor side inverter is closed or set (bit 29). |

Table 7 shows an example template used for a state inverter control mode status instance that may be referenced by the Control Mode symbol 170. The template includes data having a data type of ASCII characters (4 bits each) ("STRING"). The data included in the nested template may include Motor data and Active Front End (AFE) data. The Motor data may describe the selected Control Mode in use by the drive to control the load (typically a motor). The AFE data may describe the selected Control Mode in use by the Active Front End (AFE).

TABLE 7

State.InverterControl.ControlMode Table

| Elements | Data Type | MWA | Time Stamp | Description |
|---|---|---|---|---|
| Motor | STRING | | | It describes the selected Control Mode in use by the drive to control the load (typically a motor). |
| AFE | STRING | | | It describes the selected Control Mode in use by the Active Front End (AFE). |

Tables 8-11 show an example of nested template used for a Runtime category 126 instance. The Runtime category 126 (e.g., Runtime template instance object) may include a Control symbol 174 corresponding to a template and a Power symbol 176 corresponding to a nested template that associates an Input symbol 178, an Output symbol 180, and a direct current (DC) Bus symbol 182, each of which may be instances of nested templates. The Runtime category 126 may correspond to counters and measurements sampled during the device operation.

Table 8 shows an example template used for a runtime control template instance that may be referenced by the Control symbol 174. The template includes data having a data type of either Real value (32 bits) ("REAL") or Boolean (32 bits) ("BOOL(32)"). The data included in this template may include Position Reference, Actual Position, Position Error, Velocity Reference, Actual Velocity, Velocity Error, Acceleration Reference, Torque Reference Torque Step, At Limit Status, or the like.

TABLE 8

Runtime.Control Template Table

| Elements | Data Type | MWA | Time Stamp | Description |
|---|---|---|---|---|
| Position Reference | REAL | | | Position Reference |
| Actual Position | REAL | | | Actual Position |
| Position Error | REAL | | | Position Error |

TABLE 8-continued

Runtime.Control Template Table

| Elements | Data Type | MWA | Time Stamp | Description |
|---|---|---|---|---|
| Velocity Reference | REAL | | | Velocity Reference |
| Actual Velocity | REAL | | | Actual Velocity |
| Velocity Error | REAL | | | Velocity Error |
| Acceleration Reference | REAL | | | Acceleration Reference |
| Torque Reference | REAL | | | Torque Reference Filtered in % |
| Torque Step | REAL | | | Torque Step |
| At Limit Status | BOOL (32) | | | At Limit Status |

Table 9 shows an example nested template under a runtime power template (e.g., Power symbol 176) that may be referenced by the Input symbol 178. The nested template may include symbols corresponding to inputs received by the industrial automation device 86 for the example motor drive case. The template instance may include data having a data type of Real value (32 bits) ("REAL"). The data included in this nested template may include Power, Power Factor, Current, Voltage, Frequency, or the like. The Power data may indicate an input power in kilowatts (KW). The Power Factor data may indicate an input power factor of the input power. The Current data may indicate an input current in amps (A). The Voltage data may indicate an input voltage in volts (V). The Frequency data may indicate an input frequency of the Power data, the Voltage data, the Current data or any combination thereof, in hertz (Hz) or rotations per minute (rpm).

TABLE 9

Runtime.Power.Input Template Table

| Elements | Data Type | MWA | Time Stamp | Description |
|---|---|---|---|---|
| Power | REAL | x | | Input Power in KW |
| Power Factor | REAL | | | Input Power Factor Display |
| Current | REAL | x | | Input Current in Amps |
| Voltage | REAL | x | | Input Voltage in Volts |
| Frequency | REAL | | | Input Frequency in Hz or rpm |

Table 10 shows an example nested template nested under a runtime power template (e.g., Power symbol 176) that may be referenced by the Output symbol 180. The nested template may include symbols corresponding to outputs from the industrial automation device 86 for the example motor drive case. The template instance may include data having a data type of Real value (32 bits) ("REAL"). The data included in this nested template may include Motor Running Time data, Power data, Heatsink Temperature data, an IGBT Temperature data, Output Power Factor data, Output Current data, Output Voltage data, Velocity Error data, Output Torque data, Slip Frequency data, DC Bus Current data, DC Bus Voltage data, Output Frequency data, or the like. The Motor Running Time data may indicate motor elapsed total run time (hours). The Power data may indicate output power (KW). The Heatsink Temperature data may indicate heatsink temperature in Celsius (C) or Fahrenheit (F). The IGBT Temperature data may indicate IGBT Temperature in C or F. The Output Power Factor data may indicate an output power factor of output signals from the industrial automation device 86. The Output Current data may indicate an output current in A from the industrial automation device 86. The Output Voltage data may indicate an output voltage in V the industrial automation device 86. The Velocity Error data may indicate an output voltage error data associated with the voltage output and a voltage setpoint of the industrial automation device 86 in Hz or rpm. The Output Torque data may indicate an output torque associated with the industrial automation device 86 filtered in percent (%). The Slip Frequency data may indicate a slip frequency of outputs from the industrial automation device 86. The DC Bus Current data may indicate a Bus Observer Current Estimate in A associated with the industrial automation device 86. The DC Bus Voltage data may indicate a voltage value of voltages sent via a DC bus of the industrial automation device 86. The Output Frequency data may indicate an Output Frequency in Hz or rpm.

TABLE 10

Runtime.Power.Output Template Table

| Elements | Data Type | MWA | Time Stamp | Description |
|---|---|---|---|---|
| Motor Running Time | REAL | | | Motor Elapsed Run Time in Hours |

TABLE 10-continued

Runtime.Power.Output Template Table

| Elements | Data Type | MWA | Time Stamp | Description |
|---|---|---|---|---|
| Power | REAL | x | | Output Power in KW |
| Heatsink Temperature | REAL | | | Heatsink Temperature in Degrees Celsius |
| IGBT Temperature | REAL | | | IGBT Temperature in Degrees Celsius |
| Output Power Factor | REAL | | | Output Power Factor Display |
| Output Current | REAL | x | | Output Current in Amps |
| Output Voltage | REAL | x | | Output Voltage in Volts |
| Velocity Error | REAL | x | | Velocity Error in Hz or rpm |
| Output Torque | REAL | x | | Output Torque Filtered in % |
| Slip Frequency | REAL | x | | Slip Frequency |
| DC Bus Current | REAL | x | | Bus Observer Current Est in Amps |
| DC Bus Voltage | REAL | x | | DC Bus Volts |
| Output Frequency | REAL | | | Output Frequency in Hz or rpm |

Table 11 shows an example nested template under a runtime power template (e.g., Power symbol 176) that may be referenced by the DC Bus symbol 182. The nested template may include symbols corresponding to DC Bus operations of the industrial automation device 86 for the example motor drive case. The template instance may include data having a data type of Real value (32 bits) ("REAL"). The data included in this nested template may include DC Bus Current, DC Bus Voltage, or the like. The DC Bus Current data may indicate a Bus Observer Current Estimate in A associated with the motor drive. The DC Bus Voltage data may indicate a voltage value of voltages sent via a DC bus of the motor drive.

TABLE 11

Runtime.Power.DCBus Template Table

| Elements | Data Type | MWA | Time Stamp | Description |
|---|---|---|---|---|
| DC Bus Current | REAL | x | | Bus Observer Current Est in Amps |
| DC Bus Voltage | REAL | x | | DC Bus Volts |

Tables 12 and 13 show an example of nested template used for a Maintenance category 128 instance. The Maintenance category 128 (e.g., maintenance template object) may include the following sub-symbols corresponding to nested templates: Event Information; and Environmental Conditions.

Table 12 shows an example nested template under the Maintenance category 128 that may be referenced by an Environment Conditions object 184. The nested template may include symbols to store data corresponding to event information associated with the motor drive. The template instance may include ASCII characters (4 bits each) where a maximum number of characters may be undefined ("STRING"). The data included in the Event Information Template may include the last four predictive maintenance events for the device. The predictive maintenance events may indicate whether the remaining life of the component has fallen below a user configured threshold level. Each Event Information String is described by a property bag. Maintenance Event Information stores event information for one or more previous predictive maintenance events, such as the last four predictive maintenance events of the device. In this case, an Event Information String 0 corresponds to a 1st most recent, Event Information String 1 corresponds to a 2nd most recent, Event Information String 2 corresponds to a 3rd most recent, and Event Information String 3 corresponds to a 4th most recent. The event information string data may include a Sequence ID data, International Text data (e.g., Text describing the predictive maintenance event with support for Unicode), a Component Name data, a SubComponent Number data, a Group Name data, a Replacement Catalog Number data, a Location data, a Component Remaining Life in Hours data, a Group Life Threshold in Hour data. The Sequence ID data is a DINT (−2147483648 to 2147483647) that increment each time an alarm is generated and, therefore, creates a unique number over a long period of time, which may permit a control system to distinguish a sequence of events. The International Text data may describe the predictive maintenance event with support for Unicode. The Group Name data may include a component group descriptive name. The Component Name data may include a component descriptive name. The SubComponent Number data may differentiate between components when multiple components are associated with one identity instance. The Component Remaining Life in Hours data may specify a remaining life level below which components in this group take action to report a predictive maintenance event. The location data may identify the location of the component within a product, device, or subsystem.

TABLE 12

Maintenance.EventInformation

| Elements | Data Type | MWA | Time Stamp | Description |
|---|---|---|---|---|
| Event Information String 0 | STRING | | | Sequence ID, International Text (Text describing the predictive maintenance event with support for Unicode), Component Name, SubComponent Number, Group Name, Replacement Catalog Number, Location, Component Remaining Life in Hours, Group Life Threshold in Hours |
| Event Information String 1 | STRING | | | Sequence ID, International Text (Text describing the predictive maintenance event with support for Unicode), Component Name, SubComponent Number, Group Name, Replacement Catalog Number, Location, Component Remaining Life in Hours, Group Life Threshold in Hours |
| Event Information String 2 | STRING | | | Sequence ID, International Text (Text describing the predictive maintenance event with support for Unicode), Component Name, SubComponent Number, Group Name, Replacement Catalog Number, Location, Component Remaining Life in Hours, Group Life Threshold in Hours |
| Event Information String 3 | STRING | | | Sequence ID, International Text (Text describing the predictive maintenance event with support for Unicode), Component Name, SubComponent Number, Group Name, Replacement Catalog Number, Location, Component Remaining Life in Hours, Group Life Threshold in Hours |

Table 13 shows an example nested template under the maintenance template that may be referenced by an Event Information object 186. The nested template may include symbols to store data corresponding to environmental conditions associated with the motor drive. The template instance may include ASCII characters (4 bits each) where a maximum number of characters may be 64 ("SHORT_STRING"). The data included in the Environmental Conditions Template may include enclosure ratings and airborne contaminants data. The enclosure rating array element may specify the enclosure IP (Ingress Protection) rating or enclosure type for the environment that the product is operating in. This may be the product case or additional protective cabinets where the product is installed. Types may include Ingress Protection (IP) types, like IP00-IP66, Type1, Type 4X, or other suitable industrial environment classifications. The airborne contaminants data may specify the severity level of airborne contaminants in the environment that the product is operating in, such as G1, GX+, or the like.

TABLE 13

Maintenance.EnvironmentalConditions Template Table

| Elements | Data Type | MWA | Time Stamp | Description |
|---|---|---|---|---|
| Enclosure Rating Name | SHORT_STRING | | | IP00-IP66/Type1-Type 4X - Specifies the enclosure IP (Ingress Protection) rating or enclosure type for the environment that the product is operating in. This may be the product case or additional protective cabinets where the product is installed. |
| Airborne Contaminants Severity Level | SHORT_STRING | | | G1-GX+ - Specifies the severity level of airborne contaminants in the environment that the product is operating in |

Table 14 shows an example of a template used for the Sustainability category 130 instance that may be referenced by an Electrical object 188. Templates may be expanded after a time of commissioning of the industrial automation device 86. Thus, for the Sustainability category 130, after commissioning and installation, the template may become a nested template that includes references to additional instances.

The Sustainability category 130 may include array elements referencing data indicative of Energy Saved in kilowatt hours (KWH), Elapsed Energy Consumed in megawatt hours (MWH) and in KWH, Elpsd Mtr in MWH, Elpsd Rgn in MWH, Elpsd Mtr in KWH, Elpsd Rgn KWHrs. Each of this data may have data type of Real value (32 bits).

TABLE 14

Sustainability.Electrical Template

| Elements | Data Type | MWA | Time Stamp | Description |
|---|---|---|---|---|
| Energy Saved in KWh | REAL | | | Energy Saved in KWh |
| Elapsed MWH | REAL | | | Elapsed MWH |
| Elapsed kWH | REAL | | | Elapsed kWH |
| Elpsd Mtr MWHrs | REAL | | | Elpsd Mtr MWHrs |
| Elpsd Rgn MWHrs | REAL | | | Elpsd Rgn MWHrs |
| Elpsd Mtr kWHrs | REAL | | | Elpsd Mtr kWHrs |
| Elpsd Rgn kWHrs | REAL | | | Elpsd Rgn kWHrs |

Figure 6:
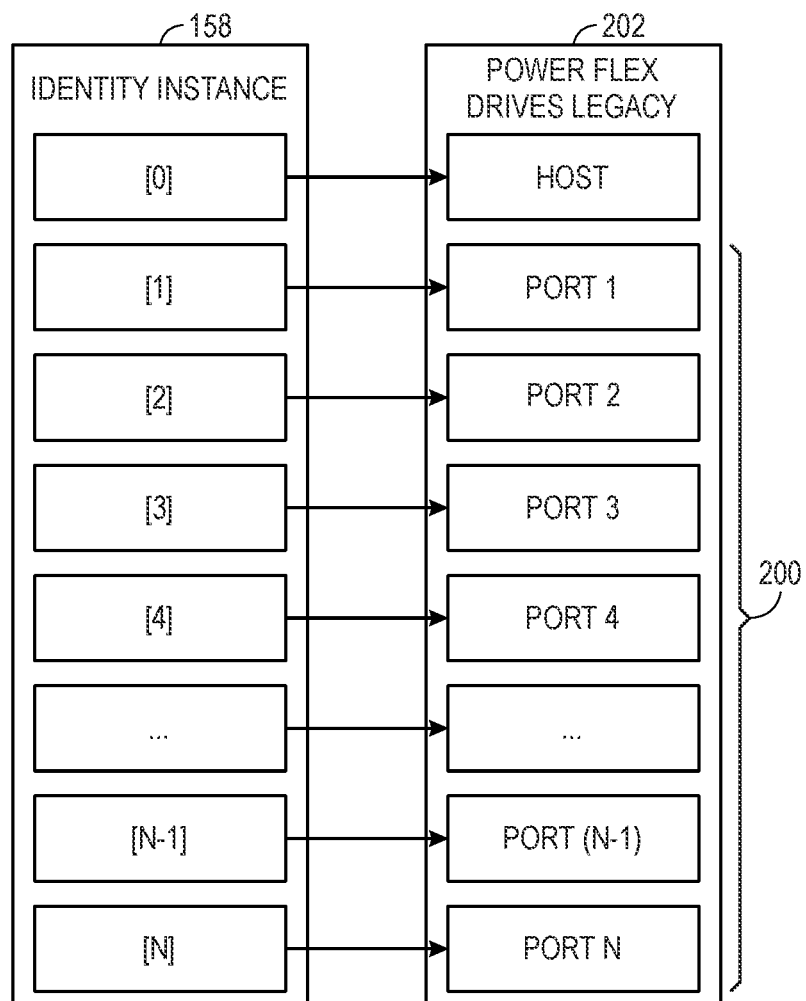
FIG. 6 is a block diagram of an example template instance (e.g., Identity instance) corresponding to data ports of a legacy device (e.g., a motor drive without symbolic data access capabilities), in accordance with an embodiment.
Figure 7:
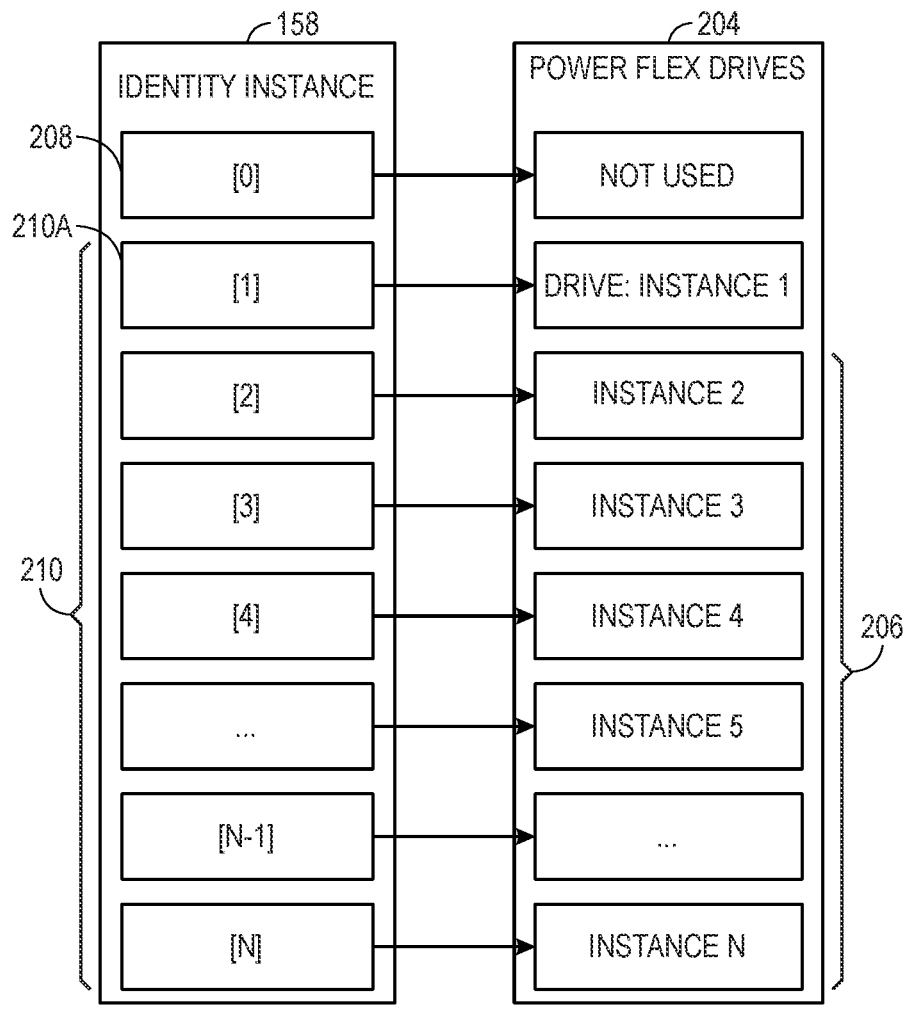
FIG. 7 is a block diagram of an example template instance (e.g., Identity instance) that corresponds to symbols of an industrial automation device with symbolic data access capabilities, in accordance with an embodiment.

FIGS. 6 and 7 illustrate example data structures of an instance of the Identity category 122. FIG. 6 is a block diagram of a template instance corresponding to data ports of a legacy device (e.g., a motor drive without symbolic data access capabilities). Indeed, FIG. 6 illustrates an Identity object instance array 158 that points to communication ports 200 of a legacy motor drive 202 to indicate a relationship between array elements of the corresponding template data and the communication ports 200. Some systems may include legacy devices without an ability to store data in template data via references to symbols 144 and templates 132.

The symbolic data operations may be compliant with these legacy devices too since the industrial automation control system 78 (or a local control system of the legacy device) may access a mapping between a type of the legacy device, properties or data types associated with target data associated with the legacy device, and a class, instance, attribute combination of the legacy device at which the industrial automation control system 78 is able to access the target data. The industrial automation control system 78 may use a common mapping referenced when accessing any legacy device within the industrial automation system 46 having the same type even if the legacy device itself does not change how it processes its associated data.

The array element number x, Identity.Instance[x], of the Identity object instance array 158 is the identity instance number. For example, a motor drive may include several optional modules and communication ports to communicate with the optional modules. Identity.Instance[1] may reference the motor drive identity information and Identity.Instance[2-15] may reference the identity of the other optional modules and corresponding communication ports 200. In a case with 14 ports, a legacy motor drive as the "Host" may correspond to a template Identity.Instance[0] and Ports 1-14 are located at template Identity.Instance[1-14]. Respective identity instance array elements (e.g., Identity.Instance[x]) may enable subscription to one or more communication ports 200 associated with the legacy motor drive, and the one or more communication ports 200 may not correspond to additional templates or objects. This structure may enable a control system to send or receive data to the communication ports 200 in a less complex routing structure than having to individually program each of the communication ports 200 to the control system. By using a template object structure (e.g., template object instance array), errors in control system programming may be reduced and overall routing between the industrial automation control system 78 and the consumer device (e.g., device coupled to one or more of the communication ports 200) may be reduced or simplified, improving efficiencies of communications.

FIG. 7 is a block diagram of a template object instance 204 corresponding to an Identity object instance array 158. The template object instance 204 may be a template object instance that corresponds to a template for a motor drive with symbolic access capabilities. Some of the Identity object instance array 158 may reference one or more nested template instances. The Identity object instance array 158 may be a user-defined template that defines a collection of data variables into a common data structure. Here, the Identity object instance array 158 may be a template instance that corresponds to one or more symbols referencing nested template instances for one or more drives (e.g., drive instances 1-n corresponding to objects 206). When a template object instance references nested template instances and/or formatting for the data, the instances that result are nested and/or preformatted too. In this way, each instance of the template may describe one or more unique data types and each instance of the template may include one or more nested templates (e.g., sub-members) and corresponding data types of the one or more nested templates.

In this motor drive example, the Identity.Instance[0] array element 208 may be reserved for class attributes and the Identity.Instance[1-n] array elements 210 may point to other instances nested under the motor drive (e.g., a symbol object instance 210A referencing another template instance "Drive: Instance 1"). Each symbol object instance may self-identify for which sub-component of the motor drive it includes corresponding data. The Identity object instance array 158 may include some of the same information available in the CIP Identity object (0x01 hex). The Identity object instance array 158 may be stored in the firmware of the motor drive.

In some cases, the Identity object instance array 158 may be an array where each array element (e.g., respective array elements of the Identity.Instance[1-n] array elements 210) represents a different product available through the same IP address of the parent device, here being the parent motor drive. The numbers of products available will depend on each device implementation. For example, one type of motor drive may include a greater number of devices internally and thus may use a greater number of array elements in the Identity object instance array 158 to represent the devices. A maximum number of instances available for use, n, may correspond to one of the class attributes of the CIP Identity object.

Since symbols 144 and templates 132 may be consistent in formatting between devices of the industrial automation system 46, an industrial automation device 86 may lack prior knowledge of individual product parameter or object models, yet still be able to self-initiate commissioning of the industrial automation device 86. Indeed, these systems and methods may provide a common interface across like devices (e.g., Drive-to-Drive, Intelligent Device-to-Intelligent Device). The symbols 144 and templates 132 may provide contextualized and aggregated data reports to operators, where a class, instance, and attribute combination need not be correlated to parameter identity for the data to be intelligible, and, instead, may be translated into a connected enterprise context. These systems and methods may be system-time synchronized and a time stamp may be added to the data when generated at the industrial automation device 86 or when received by either the on-premise gateway device 80 or by the off-premise edge gateway device 82.

Furthermore, the template 132 and the nature by which the data is stored in the instance of the template 132 may contextualize each data set, such as by a location of the data within the template 132, by using plain-language data labels as opposed to class, instance, attribute combinations, and the like.

To elaborate further on the self-initiated commissioning, when a new industrial automation device 86 is installed into the industrial automation system 46 and communication network, the industrial automation device 86 may use its stored template data to register itself to the industrial automation control system 78, or, in some cases, the industrial automation control system 78 may detect the change on the communication network and perform an industrial automation device discovery to poll devices on the network to obtain the template data from the newly installed industrial automation device 86. In some systems, a file describing the template object instances may be downloaded for use within the device. The newly installed industrial automation device 86 may self-report or respond to the polling with a device identifier, such as a serial number and/or a device type. The newly installed industrial automation device 86 may report this data as a template object instance and symbol object instance combination to the industrial automation control system 78 to enable access to the portion of the template data corresponding to the identifier (e.g., symbol object instance referencing back to that portion of template data stored on the device). Indeed, the industrial automation control system 78 may identify the newly installed industrial automation device 86 and, after identifying, read template data based on template object instances from the newly installed industrial automation device 86. The industrial automation control system 78 may understand data types and/or data structures which the device provides based on information included in a template stored in the device data templates 92 in storage 88 that corresponds to the device identifier and/or the template object instance. From there, the industrial automation control system 78 may access symbol object instances and/or the template object instances to receive template data (e.g., templated data) from the newly installed industrial automation device 86. Indeed, the industrial automation control system 78 may receive the device identifier data and may retrieve the template object instance from the device and stores that in a memory (e.g., local storage of the industrial automation control system 78, storage 88), where over time the industrial automation control system 78 may periodically update this data stored in the memory to maintain status and information corresponding to the device identified via the device identifier data. The industrial automation control system 78 may push an updated template object instance to the device to cause the device to update its operations. Template data may be templated in a data table, data structure, and/or data set and parsed according to information of the template object instances maintained on the industrial automation control system 78, which have corresponding data types and/or structures to the template stored in the device data templates 92 in the storage 88. Symbol object instances may be used with the template object instances to directly reference and access the template data stored on one or more of the industrial automation devices 86 as part of symbolic access operations.

Keeping the foregoing in mind, FIG. 8 is a flow diagram of a process 222 for operating the industrial automation control system 78 to register a newly installed industrial automation device 86, such as through device replacement operations or new installation operations. The process 222 is described as being performed by the industrial automation control system 78 and it should be understood that substantially similar operations are able to be performed by local control systems associated with the industrial automation control system 78, such as another control system associated with the industrial automation control system 78 or the like. These operations may be performed in response to processing circuitry of the industrial automation control system 78 executing instructions stored in a tangible, non-transitory, computer-readable medium, such as a memory of the industrial automation control system 78, or another suitable memory. Moreover, the operations of the process 222 are shown in a particular order; however, some of the operations may be performed in a different order than what is presented or omitted altogether.

At block 224, the industrial automation control system 78 may receive a device template object instance from the new industrial automation device 86 (e.g., new component). The template object instance may characterize a dataset stored in a memory component accessible to the industrial automation device 86. Symbol object instances associated with the industrial automation device 86 may be categorized with respect to one or more categories, including an identity of the industrial automation device, a state of the industrial automation device, a runtime status of the industrial automation device, maintenance status associated with the industrial automation device, sustainability information of the industrial automation device, or any combination thereof, as described at least with respect to FIG. 3. Indeed, the symbol object instance may correspond to a device type, a device identifier, or the like. The symbol object instances themselves are not necessarily categorized, but inherit that categorization from their associated template object instances, which may correspond to the various categories.

The new industrial automation device 86 may automatically transmit the device template object instance (e.g., a template object instance associated with the new industrial automation device 86) after being powered on and connected to a communication network used by the industrial automation control system 78. Indeed, the newly installed industrial automation device 86 may report this data as a template object instance and symbol object instance combination to the industrial automation control system 78 to enable access to the portion of the template data corresponding to the identifier (e.g., symbol object instance referencing back to that portion of template data stored on the device). The device template object instance may be transmitted via packetized data broadcast via the communication network and routed to the industrial automation control system 78 and/or via other symbolic data communication methods. In other cases, the industrial automation control system 78 may detect a change to the communication network and, in response to the detected change, may transmit signals to query the industrial automation device for the device template object instance.

At block 226, the industrial automation control system 78 may identify a type of the industrial automation device 86 based on the device template object instance using a first symbol object instance. For example, when referenced, the device symbol instance may directly communicate the device type or may provide an alpha-numeric or a numeric code to be matched to a type of device. The alpha-numeric or numeric code may be a serial number for the new industrial automation device 86, a code to be translated or mapped to a type of device, or the like.

At block 228, the industrial automation control system 78 may identify one or more nested components for the new industrial automation device 86. The type of the new industrial automation device 86 may be used to reference a template for the new industrial automation device 86, and the template may include an indication of the one or more nested components. The template corresponding to the new industrial automation device 86 may be accessed prior to any sensing data being obtained at the new industrial automation device 86, and thus may be used to register the new industrial automation device 86 to the industrial automation control system 78 prior to performing operations with the new industrial automation device 86. Template data accessed based on the template may include one or more template data associated with one or more nested components (e.g., child devices, child components) communicatively coupled to the industrial automation device 86 and represented in the template as nested templates. In some cases, the new industrial automation device 86 self-reports the one or more nested components via a device symbol object instance since symbols may reference template object instances. For example, the device symbol object instance may refer to a template object instance like that in FIG. 4 that includes four nested components.

At block 230, the industrial automation control system 78 may receive template object instances from the one or more nested components based on accessing the template object instance of the new industrial automation device 86 and the symbol object instance of each of the nested components, respectively. The template object instance corresponding to each of the nested components may be accessed via respective references to the device symbol object instance corresponding to the nested template object instance. In some cases, the industrial automation control system 78 may access template object instance directly from the one or more nested components. The template object instance may include data discussed above, such as in discussions for FIG. 5.

Based on the above-described information from blocks 226-230, the industrial automation control system 78 may generate a template object instance corresponding to components and structure of the industrial automation device 86, which may include nested template object instances for each of the nested components identified at blocks 228. The template object instance may correspond to template data that includes one or more instantaneous values stored in the memory component of the industrial automation device 86. Each of the template object instances associated with the industrial automation device 86 may be used by another device to parse template data received from the industrial automation device 86 since the template object instances indicate type, formatting, and other information about the template data relative to array elements of both. The template object instances may, within array elements, maintain a structure of references to the template data and the symbol object instances based on the one or more categories (e.g., categories 122-130 of FIG. 3).

At block 232, the industrial automation control system 78 may store the template object instance of the industrial automation device 86 and/or template data corresponding to the template object instance in the storage 88. The industrial automation control system 78 may store the template data in a data repository, such as the master product data repository 90. Storing the template data may include the template data with other datasets in the data repository. The stored datasets may be stored as common data exposed to other industrial automation devices, and each of the industrial automation devices may communicate with an additional industrial automation device of the same type of the industrial automation device 86 using the template data. Context data associated with the template data may be referenced when storing the template data into the storage 88. In some cases, the industrial automation control system 78 may change how the template data is stored based on the context, for example by storing data for similar units, similar types of device, similar nested components, or the like, together in the storage 88. Storing the template object instances and template associated data in the storage 88 may enable other devices to access the template data based on the corresponding template object instance, such as the on-premise gateway device 80 and/or the off-premise edge gateway device 82.

At block 234, the industrial automation control system 78 may generate and send a control signal to perform a control action based on the template data and the template object instances. The control action may correspond to an adjustment of an operation of the new industrial automation device 86, an initial operation of the new industrial automation device 86, or the like. The control signal may be a suitable signal to cause the new industrial automation device 86 to operate in a way to implement the adjustment of the operation or the initial operation. In some cases, the industrial automation control system 78 publishes data into the template data of the new industrial automation device 86 via symbolic data operations that reference a combination of the template object instance and the symbol object instance for that data. The template data, after being updated with the published data, may be read by one or more components of the new industrial automation device 86 and/or a local control system of the new industrial automation device 86 to implement the control action.

For example, a template object instance corresponding to the State category 124 may include information corresponding to health data (e.g., corresponding to a Health symbol 166 object instance) and alarm data (e.g., corresponding to an Alarm Information symbol 162 object instance). When the template data is accessed, the information of the template object instance may enable parsing of the template data. For example, the template data may include health data and alarm information in a same dataset. A device, such as the industrial automation control system 78 may interpret and process the template data based on the template object instance. In this way, the same data set is used by the industrial automation control system 78 to determine that health data of the template data is indicating the industrial automation device 86 is operating in normal range, but the alarm information of the same template data may indicate a cautionary alert. The cautionary alert may not be linked to the heath data being outside of a desirable or target range. Nevertheless, the template data may provide both pieces of data to allow control action to be implemented to remove or address the cautionary alert (e.g., adjusting operation of the industrial automation device 86 to correct the cautionary alert based on the alarm data) while accounting for effects to the health data to keep the health data within a desirable range. The control action may be implemented via the control signal or via updated data being published to the industrial automation device 86. In some cases, the control action may be implemented by accessing the template object instance and the symbol object instance to publish the specific target data to a portion of the template data without sending a larger portion of template data back to the industrial automation device.

In some cases, the industrial automation control system 78 may generate and send a control signal based on additional template data received from the industrial automation device 86, such as after the industrial automation device 86 is registered to the industrial automation control system 78 and/or after block 232. After receiving at least some of the additional template data, the industrial automation control system 78 may store the additional template data to replace the template data in the additional memory component, such as in the storage 88 and/or the data repository. The industrial automation control system 78 may determine an adjustment to an operation of the industrial automation device 86 based on the additional template data. For example, the industrial automation control system 78 may determine the adjustment based on a difference between the additional template data and the template data exceeding or crossing a threshold value. After determining the adjustment, the industrial automation control system 78 may send an additional control signal or publish the updated data to the industrial automation device 86 to implement the adjustment determined based on the additional template data.

Keeping the foregoing in mind, the industrial automation devices 86 (e.g., new devices, existing devices) may include components that generate data, such as status data and/or sensing data. An industrial automation device 86 receiving this generated data may store the data in its template data via symbol object instances for later access. The new industrial automation device 86 of FIG. 8 may wait until being registered to the industrial automation control system 78 before storing generated data, or in some cases may log the data into the template data via the symbol object instances as part of retroactive data logging operations. Indeed, an industrial automation device 86 may have a data source (e.g., sensor) already connected to (e.g., referencing) its symbol object instance prior to a request for data from a client tool, such as a gateway (e.g., on-premise gateway device 80, off-premise edge gateway device 82) and/or the industrial automation control system 78. The industrial automation device 86 may know where to place the data of the data source in the template data based on the structure of the template object instance, which represents the aggregated category corresponding to the data from the data source (e.g., whether the data corresponds to identity, sustainability, status, and so on). Furthermore, some industrial automation devices 86 may generate context data to store with the data or to adjust how the data is stored, such as within the template object instance(s) and/or within the template data. A gateway (e.g., on-premise gateway device 80, off-premise edge gateway device 82) and/or the industrial automation control system 78 may use the context data provided by the industrial automation device 86 to determine a relationship or discover the relationship based on the data accessed in the industrial automation devices 86 to perform a monitoring operation, a control adjustment, or the like.

Figure 9:
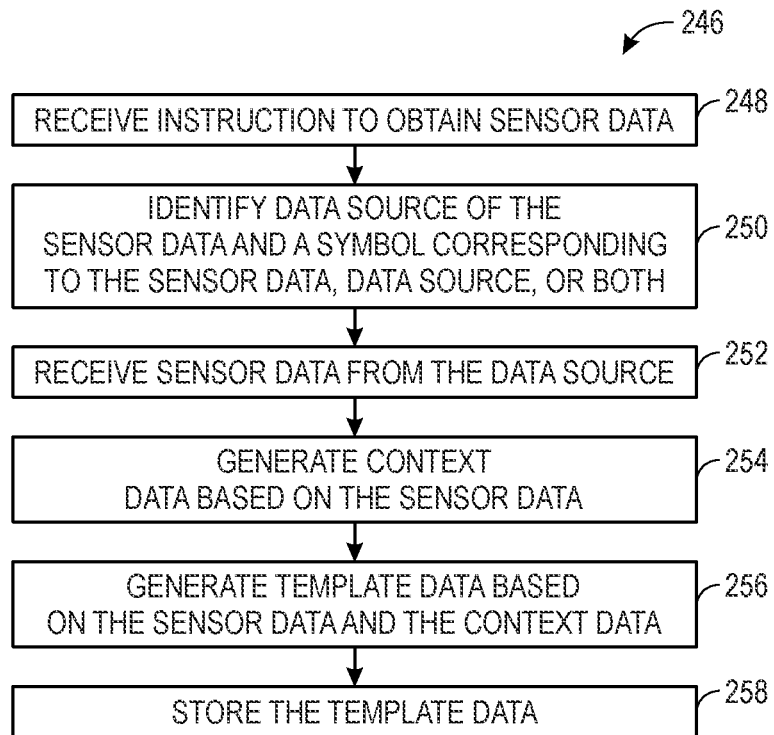
FIG. 9 is a flow diagram of a process for operating an industrial automation device to generate a template based on data from a sensor that includes context data, in accordance with an embodiment.

To elaborate, FIG. 9 is a flow diagram of a process 246 for operating an industrial automation device 86 to generate template data based on data from a sensor that includes context data. The process 246 is described as being performed by an industrial automation device 86 and it should be understood that substantially similar operations are able to be performed by local control systems associated with the industrial automation device 86. These operations may be performed in response to processing circuitry of the industrial automation device 86 executing instructions stored in a tangible, non-transitory, computer-readable medium, such as a memory of the industrial automation device 86, or another suitable memory. Moreover, the operations of the process 246 are shown in a particular order; however, some of the operations may be performed in a different order than what is presented or omitted altogether. Certain voltage and current values may be described herein, but it should be understood that these are example values and example ranges, which may be adjusted for specific systems and implementations.

At block 248, the industrial automation device 86 may receive an instruction to obtain sensor data, such as data generated by a sensor during a sensing operation. The sensor may be any suitable sensor used in industrial automation systems, for example pressure sensors, voltage sensors, current sensors, temperature sensors, motion sensors, image sensors (e.g., cameras), infrared sensors, audio sensors, or the like. The instruction may be received from a control system, such as the industrial automation control system 78, and/or from a local device, such as a local control system, of the industrial automation device 86 that coordinates sensing operations of the industrial automation device 86. Sometimes, the instructions may be generated in response to a local control system of the industrial automation device 86 applying a configuration and/or in response to the industrial automation device 86 being powered on.

Based on the received instruction, at block 250, the industrial automation device 86 may identify a data source of the sensor data and a symbol object instance corresponding to the sensor data, the data source, or both. The symbol object instance identified is referenced to store the data in the template data for subsequent access by other devices and/or reporting to the industrial automation control system 78. The data source may indicate the symbol object instance to be used when the data source is associated with the symbol object instance. The industrial automation device 86 may reference the storage 88 and/or its own internal memory when identifying a symbol object instance corresponding to the sensor data. Different sensor data may correspond to different categories of symbols and different relative locations within the template data, and thus different template object instances and different symbol object instances.

At block 252, the industrial automation device 86 may receive the sensor data from the data source identified in the instruction. The industrial automation device 86 may transmit a control signal to trigger the transmission of the sensor data from the data source. Indeed, in response to the instruction and after determining the symbol object instance to associate to the sensor data, the industrial automation device 86 may operate a sensor to perform a sensing operation to generate the sensor data and/or may receive data from a sensor that performs ongoing sensing operations. The generated sensor data may be of a variety of data types and correspond to a variety of units, like volts (V), amps (A), pound-force per square inch (PSI), Fahrenheit (F), or the like. The different data types and units may be associated within a shared template structure for the industrial automation device 86.

At block 254, the industrial automation device 86 may generate context data based on the sensor data. The context data may be metadata for the sensing data, plain-language data labels as opposed to class, instance, attribute combinations, or the like. In some cases, the context data includes a label describing the sensor, a timestamp associated with each of the one or more instantaneous values, a relative location of each of the one or more instantaneous values within the template instance data, or any combination thereof. The industrial automation device 86 may adjust an operation, store the context data with the sensor data or with the information of the template object instance, and/or adjust how the sensor data is stored within the template object instance based on the context data. In some embodiments, a location of data within the template data may be changed based on the context data. For example, sensing data generated from sensing circuitry of a nested device may be nested or otherwise structurally associated with the nested device within the parent device's template data.

At block 256, the industrial automation device 86 may generate template data based on the sensor data and the context data. The template data may be similar in structure to the template object instance. The template data may include the sensor data and the context data. In some cases the template data may be altered or adjusted based on the senor data and/or the context data.

At block 258, the industrial automation device 86 may store the template data and/or the context data in local memory. The industrial automation device 86 may then store the sensor data using the corresponding symbol object instance into the template data. If template data for the sensor data and/or data source already existed in the local memory, the industrial automation device 86 may store the sensor data in a way to override previous data stored in the template data. When there is a preexisting template instance, the industrial automation device 86 may skip generating the template data at block 256 and store over the preexisting template data.

In some cases, the industrial automation control system 78 may reference the template object instance generated by the industrial automation device 86 and determine to adjust an operation of the industrial automation device 86 based on the template data characterized based on the template object instance. To implement the adjustment to the operation, the industrial automation control system 78 may process and repackage an instruction to cause the adjustment, such as a control signal, using the template object instance and symbol object instance (e.g., data structure implementable via symbolic data methods) by the industrial automation device 86).

Figure 10:
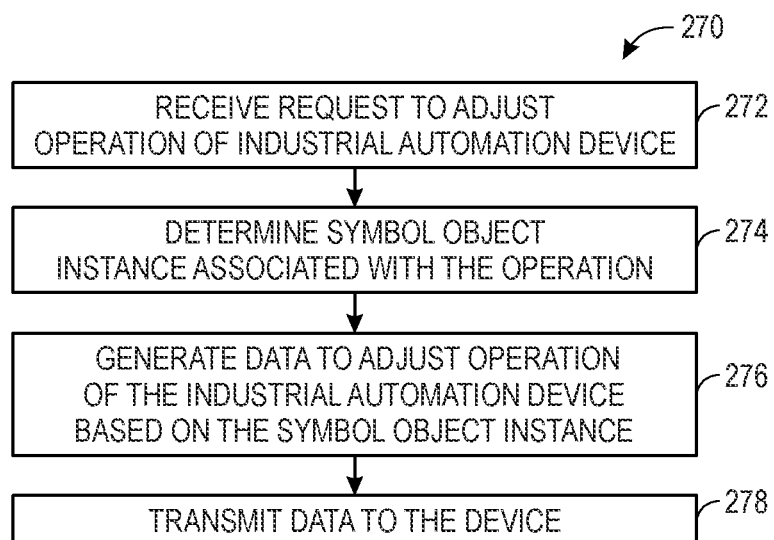
FIG. 10 is a flow diagram of a process for operating the industrial automation control system to generate template structure data based on a request to adjust an operation of an industrial automation device, in accordance with an embodiment.

To elaborate, FIG. 10 is a flow diagram of a process 270 for operating the industrial automation control system 78 to adjust an operation of an industrial automation device 86 based on template data. The process 270 is described as being performed by an industrial automation control system 78 and it should be understood that substantially similar operations are able to be performed by local control systems associated with the industrial automation control system 78. These operations may be performed in response to processing circuitry of the industrial automation control system 78 executing instructions stored in a tangible, non-transitory, computer-readable medium, such as a memory of the industrial automation control system 78, or another suitable memory. Moreover, the operations of the process 270 are shown in a particular order; however, some of the operations may be performed in a different order than what is presented or omitted altogether. Certain voltage and current values may be described herein, but it should be understood that these are example values and example ranges, which may be adjusted for specific systems and implementations.

At block 272, the industrial automation control system 78 may receive a request to adjust an operation of the industrial automation device 86. The request may be received from the on-premise gateway device 80, the off-premise edge gateway device 82, from another industrial automation device 86, or the like. For example, the on-premise gateway device 80 may receive the request from the software application 96 executed on the on-premise computing device 74.

At block 274, the industrial automation control system 78 may determine a symbol object instance associated with the operation of the industrial automation device 86. Within a template instance of the industrial automation device 86, different symbol object instances may be read by components of the industrial automation device 86 when performing an operation. For example, a local control system of the industrial automation device 86 may read a frequency symbol object instance referencing data populated by the industrial automation control system 78 to determine at which frequency to operate a fan, a motor drive, or other components of the industrial automation device 86.

Based on the template instance, at block 276, the industrial automation control system 78 may generate data to adjust the operation of the device based on a value accessed based on the symbol object instance. Here, the industrial automation control system 78 may repackage the request to adjust the operation into a format able to be implemented via the industrial automation device 86. The industrial automation control system 78 may change the data by referencing the symbol object instance to replace an existing data value referenced via the symbol object instance with the new generated value. At block 278, the industrial automation control system 78 may transmit generated data to the industrial automation device 86 for storage according to the symbol object instance and the template instance. For example, the industrial automation device 86 may store the generated data at a memory location corresponding to "templateinstance.symbolobjectinstance" using a reduced number of look-up operations to translate where the generated data is to be stored, which may reduce a number of computing resources used to implement the adjustment relative to look-up operations. After receiving the generated data, symbol object instance, and the template instance, the industrial automation device 86 may have the operation adjusted based on the changed data.

In some embodiments, the off-premise edge gateway device 82 accessing the template instances via the on-premise gateway device 80 may involve instantiation of a client on the on-premise gateway device 80. Using a client may improve exchange of data between the industrial automation device 86 and the off-premise edge gateway device 82. For example, the client may enable the off-premise edge gateway device 82 to directly subscribe to information provided by or stored within the industrial automation device 86. The off-premise edge gateway device 82 may create a client on the on-premise gateway device 80 to access the stored data from the template instances stored in the industrial automation devices.

Figure 11:
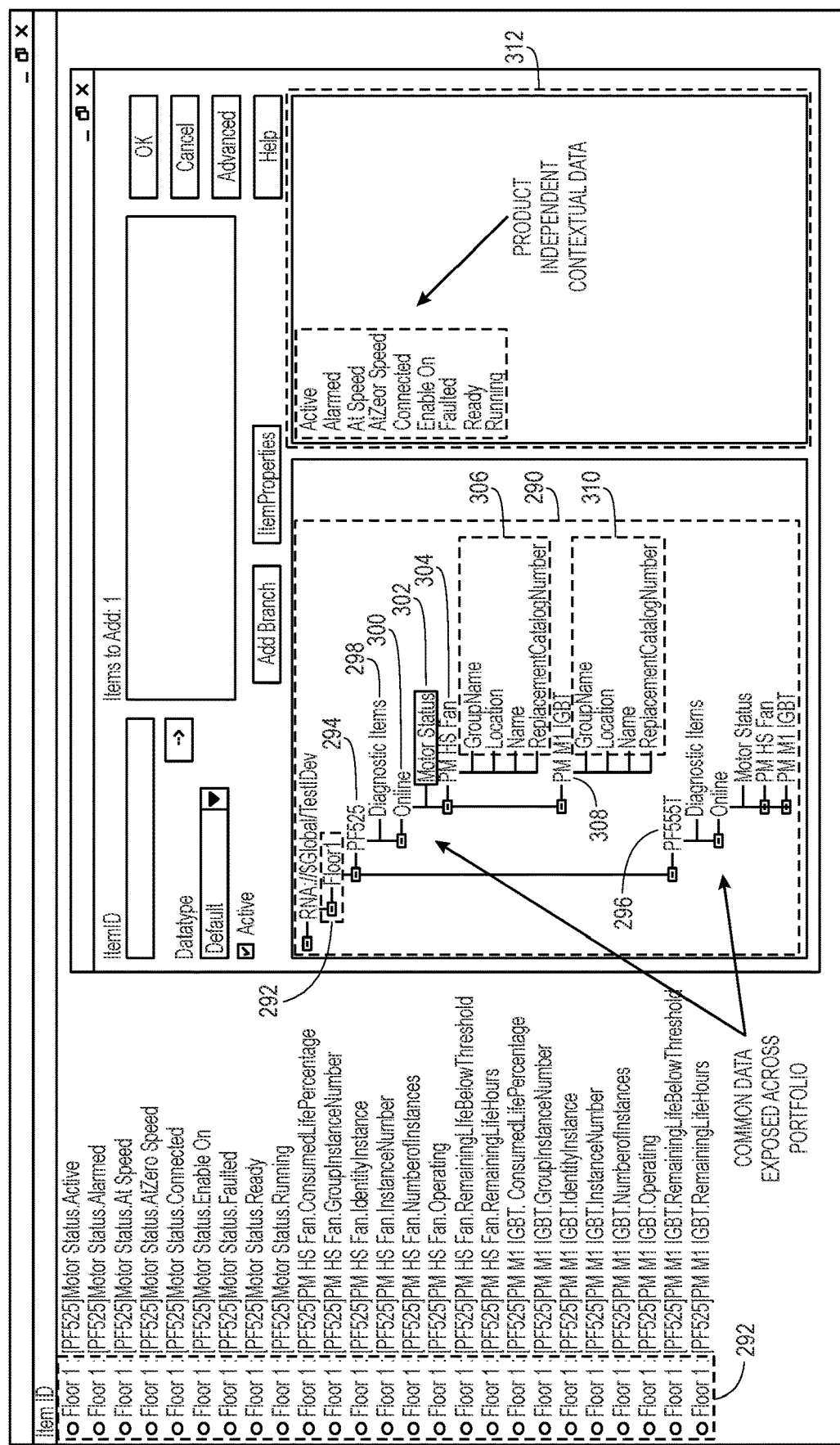
FIG. 11 is an illustration of a graphical user interface (GUI) corresponding to a client instantiated to obtain data from the industrial automation system of FIG. 1, in accordance with an embodiment.

To elaborate, FIG. 11 is an illustration of a graphical user interface (GUI) corresponding to a client. The various industrial automation devices 86 (e.g., standard device, connected device, smart device) may expose data according to the symbol and template object instances, such that the on-premise gateway device 80 and/or the off-premise edge gateway device 82 may be able to view common data 290 that may be exposed across a portfolio as depicted in the GUI of FIG. 11. In some embodiments, the common data 290 may be exposed according to a device data model, which may include template object instances representing categories of information such as identity, state, runtime, maintenance, and sustainability. By storing the data in this format, a local controller within the devices may not be required for other devices connected to the on-premise gateway device 80 or the off-premise edge gateway device 82 to access or view the data stored in the devices. Moreover, the device seeking or requesting the common data 290 from the devices storing the common data 290 do not require prior knowledge of individual product parameters or object instance models. Instead, the common data 290 (e.g., exposed symbol and template object instances) may be viewable by the respective device. As a result, the namespace of the devices may be correlated with namespaces used by other devices.

The GUI illustrates a unit hierarchy (e.g., "Floor 1" indication 292), where the different symbols are grouped based on the context data that each are related to a same floor of a unit 50. Floor 1 includes two industrial automation devices 86—a first motor drive (e.g., symbol object instance 294 "PF525") and a second motor drive (e.g., symbol object instance 296 "PF755T"). Both motor drives are represented as respective symbol object instances corresponding to nested template object instances. However, the templates and symbols used to represent the motor drives are the same and may be respectively implemented as separate instances to represent the different motor drives. For example, symbol 298 corresponds to data associated with "diagnostic items" and is respectively implemented as two symbol object instances for each Symbol object instance 300 references to a nested template object instance that characterizes data associated with determining an "online" status, such as a "motor status" symbol object instance 302, a symbol object instance 304 that references to a "PM HS Fan" nested template instance (that includes its own symbol object instances 306), and a symbol object instance 308 referencing to a "PM M1 IGBT" nested template instance (that includes its own symbol object instances 310). The industrial automation control system 78 may associate both the first motor drive (e.g., symbol object instance 294 "PF525") and the second motor drive (e.g., symbol object instance 296 "PF755T") with a same device type, which may result in the same template being referenced when registering the devices to the industrial automation system. In this GUI, the "motor status" symbol object instance 302 of the first motor drive (e.g., symbol object instance 294 "PF525") is selected and different data options are shown in a graphical display region 312. Based on one or more other reported symbol statuses, the "motor status" symbol object instance 302 may change in value, such as by a local control system of the industrial automation device 86 (or of Floor 1) updating the reported value over time.

FIG. 12 is a diagrammatic representation of an example symbolic data structures, such as an example template object instance 320 corresponding to the template 132, an example symbol object instance 322, an example template data 324 (e.g., example template dataset), and an example address path 326 (IOI). It is noted that for performance reasons (e.g., accessing stored data via IOI may sometimes consume fewer resources or power in processing the request), IOI may be used. Reference arrow 328 graphically indicates within the template object instance 320 how the template object instance 320 may define a formatting of a symbolic data reference to a particular value of the example template data 324. The template object instance 320 may mirror the structure of the template 132. For example, when a device references the symbol object instance 322, "DataMember1," and the template object instance 320, "DataStructure," (e.g., via "DataStructure.DataMember1"), the device may access a data value 330 (e.g., to read, to write over) and determine a format of the data value 330 as UINT, as well as a relative position within the template data 324 of the data value 330, from the template object instance 320, which may be stored in memory accessible to the device, as described above.

Included in symbolic data operations may be the ability to encode one or more addressing paths, which may each be an internal object identifier (IOI) path to a respective object. For example, the address path 326 may be encoded and be an IOI path to the symbol object instance 322. Addressing paths may identify, through a logical operation, data tables represented by a symbol object instance to provide a more efficient access operation. A respective addressing path and a corresponding symbol object instance may represent the same data while permitting access in different ways to assist with better performance needs. For example, the address path 326 and the symbol object instance 322 both reference to data value 330.

Keeping the foregoing in mind, one example implementation includes a motor drive, which may be a relatively small device (e.g., relatively low horsepower) or a very large device (e.g., relatively high horsepower) with many different components internal to the motor drive. A motor drive may include certain components, like capacitors and fans. These components may individually require maintenance overtime and thus may be advantageously monitored individually via the symbol/template data access techniques. The symbol/template data access techniques may be used to make a template for each identifiable component within the product. Thus, in a particular product, different symbol object instances may correspond to the motor drive, a motor-side power output, a line-side power input, one or more of the capacitors, one or more of the fans, and any additional plugin options of the motor drive. The different symbol object instances for the different inputs, outputs, and components of the motor drive, as well as the motor drive overall, may permit individual component electronic identification and monitoring. The industrial automation control system 78 individually identifying and monitoring the motor drive, its related inputs and outputs, and its internal or associated components may provide individualized maintenance alerts, individual performance alerts, individual control commands, or the like based on the symbol object instances to more particularly tailor recommendations, alerts, or performed actions to the various components at the different levels. This may improve industrial automation system operation by at least reducing total downtime with maintenance operations due to the tailored recommendations.

In some cases, the industrial automation device 86, in response to being initially powered-on and communicatively coupled to the industrial automation control system 78 via a communication network to reports its own nested devices without further intervention from a control system. The industrial automation device 86 may do so by reporting a template object instance preloaded into the industrial automation device 86. Sometimes, the industrial automation control system 78 may receive instruction to power on the industrial automation device 86 and the industrial automation device 86 in response to being powered on reports the nested devices. Some industrial automation devices 86 may not auto-report nested devices. These devices may report nested devices in response to an instruction or a control signal from the industrial automation control system 78 to do so. In any case, the industrial automation control system 78 registers the nested devices of the industrial automation device 86 in response to receiving an indication of the nested devices from the industrial automation device 86. Sometimes, the industrial automation control system 78 may commence registration of the industrial automation device 86 in response to receiving the indications of the nested devices via the reporting.

On-Premise Gateway Device Systems and Methods

Figure 13:
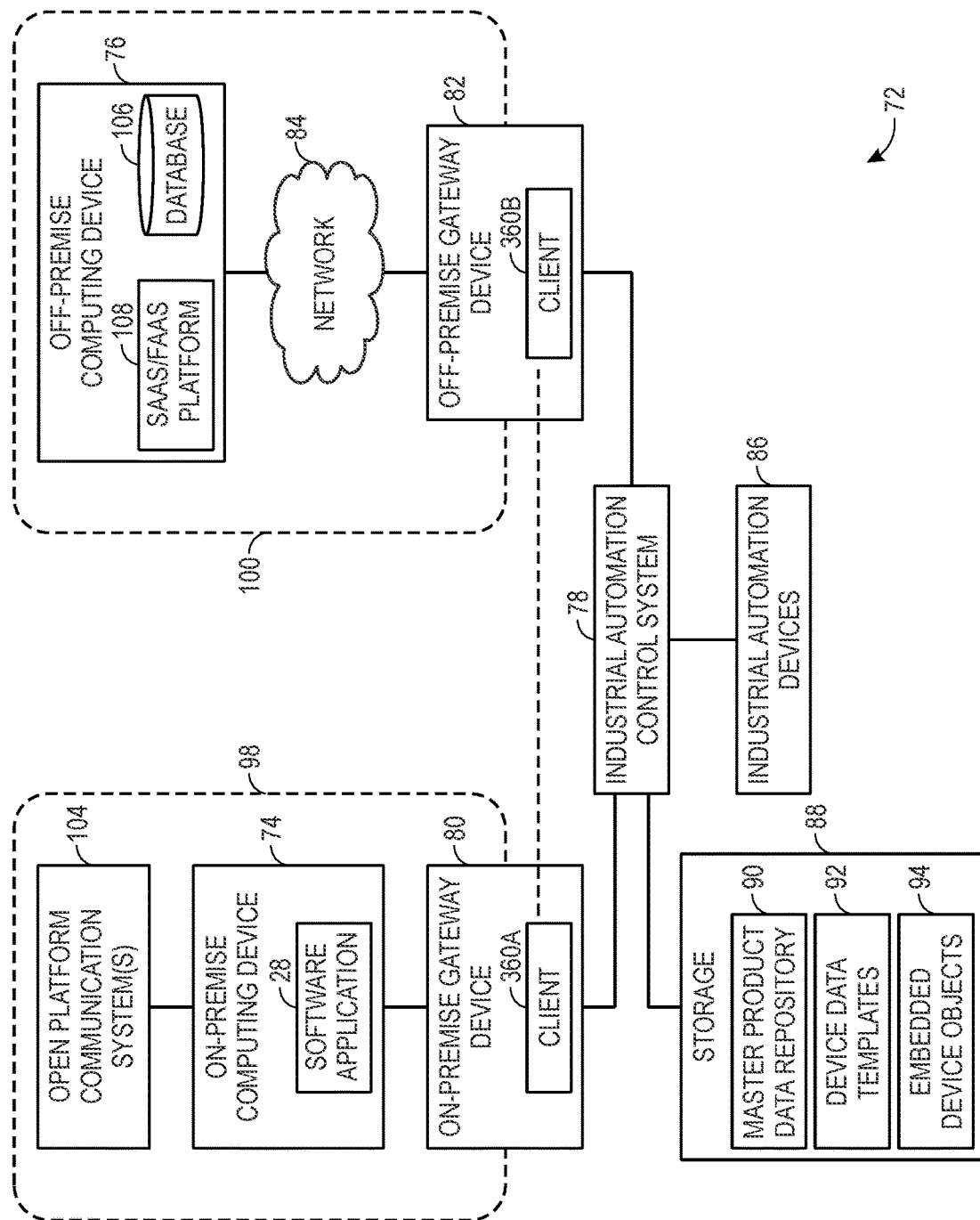
FIG. 13 is a system that includes the industrial automation system of FIG. 1 having off-premise computing devices, a client of the on-premise gateway device, and a client of the off-premise gateway device, in accordance with an embodiment.

As described above, the on-premise gateway device 80 may access template data stored in the industrial automation system 46 on behalf of one or more on-premise computing devices, like the on-premise computing device 74. To elaborate, FIG. 13 illustrates the example system 72 that includes the on-premise computing devices 74, the off-premise computing devices 76, and the industrial automation control system 78. In some embodiments, the on-premise gateway device 80 and the off-premise gateway device 82 may directly communicatively couple to each other. The on-premise gateway device 80 may also communicate on networks internal to the industrial automation system 46 with devices within the industrial automation system 46. The networks internal to the industrial automation system 46 may be included in the on-premise computing domain 98 and may be external to the off-premise computing domain 100.

The on-premise computing device 74 may provide one or more software applications 96. The software applications 96 may include monitoring software, data processing software, or the like, such as operational technology (OT) software. The OT software may monitor and detect when processes of the industrial automation system 46 change and, in response to detecting the change, may cause the industrial automation control system 78 to adjust one or more operations to respond to the change. The software applications 96 may analyze operations of the industrial automation system 46 to facilitate increasing production, reducing costs (e.g., reducing downtime by increasing reliability thereby reducing costs associated with downtime), increasing quality of products produced, or the like. The analysis performed by the software applications 96 may occur in real time, in response to real-time evaluated operating conditions, in response to operating conditions retroactively, on a defined periodic basis, in response to an input, such as from a user, or the like. In some cases, one or more of the software applications 96 may monitor equipment and provide updated information on current machine performance of the industrial automation system 46. For example, historian software may be included with the software applications 96 and the historian software may automatically identify, gather, and store real-time process and production information, including data from legacy systems. The software applications 96 may enable operator interaction and viewing of data of the industrial automation system 46 via a GUI. As such, the on-premise gateway device 80 may convert template data into a data structure suitable for visualization on the GUI.

The off-premise computing device 76 may provide one or more software applications corresponding to a SaaS/FaaS platform 108. The SaaS/FaaS platform 108 may perform historical trending services off-site based on data generated by the industrial automation system 46. The SaaS/FaaS platform 108 may correspond to cloud computing and/or server-based computing operations. The SaaS/FaaS platform 108 may be shared among other industrial automation systems 46. Despite being shared, data corresponding to one industrial automation system 46 may be maintained and provided separate from data corresponding to another industrial automation system 46. The off-premise computing device 76 may sometimes use both datasets to compare processes, such as determining an average or expected type of performance for one type of process. In response to data analysis of the off-premise computing device 76, the off-premise computing device 76 may determine an adjustment to implement at the industrial automation devices 86 and may generate a control signal to transmit to the off-premise gateway device 82 for conversion and transmission to downstream devices of the industrial automation system, such as the on-premise gateway device 80 and/or the industrial automation control system 78. The off-premise gateway device 82 and/or the on-premise gateway device 80 may convert the control signal into a protocol signal compatible with templates and symbols (e.g., symbolic data operations).

The on-premise gateway device 80 and/or the off-premise gateway device 82 may include one or more clients 360 (client 360A, client 360B). The clients 360 may be hardware or software components or a mix of both hardware and software components, that respectively access a service made available by a server as part of a client and server model of computer networks. Clients 360 may send a request to another hardware or software component that accesses a service made available by a server, which may be located outside of the on-premise gateway device 80 and/or the off-premise gateway device 82. The clients 360 may automatically publish data to connected devices and/or services, respectively. Thus, one of the clients 360 may request data from the other client 360 and, upon receipt of the requested data, may publish the requested data via its connection to downstream systems for respective future access by the downstream systems. For example, client 360B may request template data from client 360A and may convert the template data into a data structure usable by the off-premise computing device 76.

Data associated with the various device-level systems may be accessed by other components of the industrial automation system 46 via the on-premise gateway device 80 (e.g., Linx Enterprise). The on-premise gateway device 80 may be locally connected to one or more industrial automation devices 86, one or more control systems, or a combination of the two, and communicate with the various devices using messages and/or control signals that follow a common industrial protocol (CIP) or other suitable OT communication protocol. The on-premise gateway device 80 may access symbols stored in the industrial automation devices to process read requests as opposed to waiting to receive identifying information about each device and a mapping to the requested data for each device to read the requested data.

Figure 14:
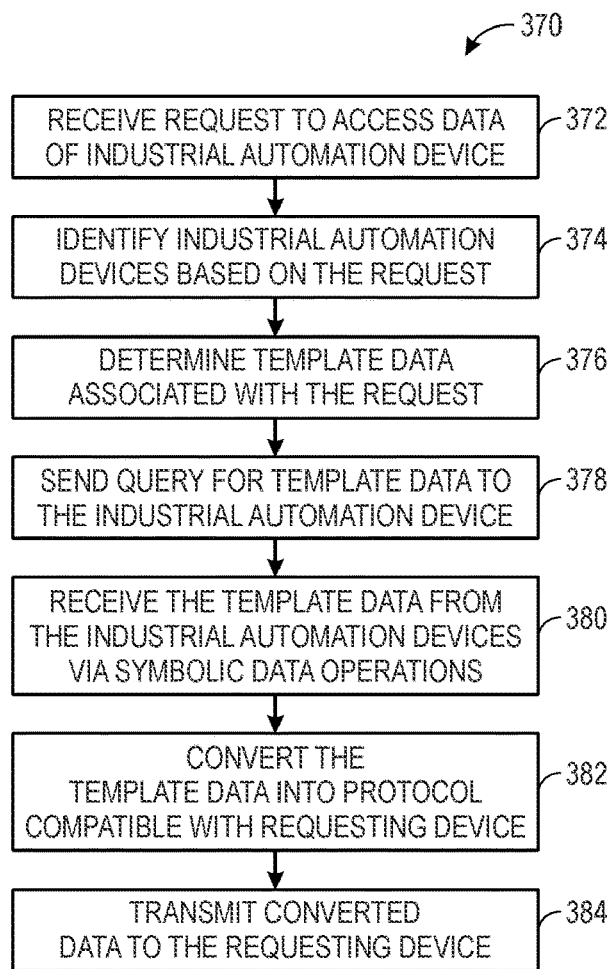
FIG. 14 is a flow diagram of a process for operating the on-premise gateway device to perform a data access operation, in accordance with an embodiment.

Keeping the foregoing in mind, FIG. 14 is a flow diagram of a process 370 for operating the on-premise gateway device 80 to perform a data access operation. Although the process 370 is described as being performed by the on-premise gateway device 80, these operations may be performed in response to processing circuitry of the on-premise gateway device 80 executing instructions stored in a tangible, non-transitory, computer-readable medium, such as a memory of the on-premise gateway device 80, or another suitable memory. Moreover, the operations of the process 370 are shown in a particular order; however, some of the operations may be performed in a different order than what is presented or omitted altogether.

At block 372, the on-premise gateway device 80 may receive a request to access data of the industrial automation device 86. The request may originate from a control system of the on-premise gateway device 80, a control system of the on-premise computing device 74, a connected application (e.g., software application 96, SaaS/FaaS platform 108), or from an off-premise device, like the off-premise computing device 76. The device generating the request may be "blind" to symbolic data operations of the industrial automation system 46. Thus, the on-premise gateway device 80 may operate on a boundary between symbolic data access and non-symbolic data access. The on-premise gateway device 80 may process the request and coordinate acquisition of the desired data indicated via the request.

At block 374, the on-premise gateway device 80 may identify one or more industrial automation devices 86 based on the request received at block 372. The request may indicate a subset of industrial automation devices 86, a type of industrial automation devices 86, or the like. That is, the request may include an address, an indication of a target component, or the like within a data packet providing the request. In some embodiments, the request may include an indication of a condition or a parameter, which may be used to query a list of the industrial automation devices 86 accessible via the on-premise gateway 80 stored in storage 88. The query may be based on information included or indicated by the request. The on-premise gateway device 80 may query the storage 88 to determine one or more industrial automation devices 86 identified via the request as desired to obtain related data. The query may result in query results being generated. From the query results, the on-premise gateway device 80 may identify the one or more industrial automation devices 86 based on the request. For example, the request may specify, as a query condition, that data is desired for "all motor drives," data is desired for "current data from unit 2 circuit breakers," or the like. The request indicating "all motor drives" may cause the on-premise gateway device 80 to search the storage 88 for indications of each motor drive of the industrial automation system 46. The request indicating "current data from unit 2 circuit breakers" may cause the on-premise gateway device 80 to search the storage 88 for indications of each circuit breaker physically disposed in a unit 50 corresponding to "unit 2."

At block 376, the on-premise gateway device 80 may determine template data associated with the request received at block 372. The template data may be data stored by the devices identified at block 374, such as devices identified based on the query of the storage 88 using search terms indicated via the request. In some embodiments, the on-premise gateway device 80 may identify or determine template data associated with the request based on information provided in the request itself. For example, the template data may be specifically called out by name or determined based on an input into a data field (e.g., selection or input of an indication of an option via a field with any number of set options) corresponding to the request.

However, if the request does not specify the template data, the on-premise gateway device 80 may access a mapping that details relationships between a number of devices, device types, and the like and corresponding template datasets. That is, the request received at block 372 may include template data but it may also lack template data if the device sending the request is unfamiliar or incompatible with symbolic data-based operations. In this case, the on-premise gateway device 80 may consult the mapping to determine a corresponding template data that matches the information (e.g., requested data) provided in the request received at block 372. As such, the mapping may be pre-defined for a number of devices, device types, types of requests, and the like.

In some cases, the on-premise gateway device 80 may use machine learning or process tracking operations to identify suitable corresponding template data over time based on previous requests or operational analysis. That is, the on-premise gateway device 80 may receive a request lacking a specified template data and monitor the resulting data used to facilitate the request. The data provided in response to the request may be selected by a user via the industrial automation device 86 that is associated with the requests 372 or provided automatically from the industrial automation device 86. For instance, the on-premise gateway device 80 may forward the request to the specified industrial automation device 86 in its native format and protocol. As such, the on-premise gateway device 80 may receive a response from the industrial automation device 86 in the same format. In some cases, a user or expert may associate an existing template dataset to the received response and the on-premise gateway device 80 may store the association in the mapping. In some cases, the on-premise gateway device 80 may receive the response and query the mapping to identify a similar data structure or set of data that matches the received response. Here, the on-premise gateway device 80 may associate any identified match as the corresponding template data. The automatic identification process may be verified by a user input or some other suitable confirmation process. In any case, the on-premise gateway device 80 may determine a combination of process states and/or data values that resulted in the on-premise computing device 74 requesting a particular portion of template data. As a result, the on-premise gateway device 80 may employ machine learning or process tracking operations to determine the template data associated with the request received at block 372.

At block 378, the on-premise gateway device 80 may send a query to an industrial automation device 86 for the template data determined at block 376. The query may involve the on-premise gateway device 80 and/or the industrial automation control system 78 accessing the desired template data stored in the industrial automation device using symbolic data operations. For example, the on-premise gateway device 80 may access template data via a combination of a template object instance and a symbol object instance (e.g., "example 1 template object instance.symbol object instance").

After querying the template data, at block 380, the on-premise gateway device 80 may receive the template data from the industrial automation device 86 via the symbolic data operations used at block 378. The query for the data may be made using symbolic data operations and thus may directly enable the on-premise gateway device 80 to read the template data from memory of the industrial automation device 86.

At block 382, the on-premise gateway device 80 may convert the template into a protocol compatible with the requesting device that generated the request received at block 372. In some cases, the on-premise gateway device 80 may convert the template data from a first protocol into a second protocol and later into a third protocol, such as when the starting and ending locations of the data are different. The template data may be converted into converted data suitable for processing by the requesting device. The on-premise gateway device 80 may convert the template into a protocol used to receive the request at block 372.

At block 384, the on-premise gateway device 80 may transmit the converted data to the requesting device. In some cases, the converted data may be transmitted within or with the original request. Upon receiving the converted data, the requesting device may store the converted data or further process the converted data, such as to analyze an operation of the industrial automation system 46 and/or interpret the converted data to obtain insight into the operation of the industrial automation system 46.

As discussed above, when determining the template data associated with the request via operations of block 376, the on-premise gateway device 80 may access a mapping between the requesting device and the target template data when determining what template data to request. The mapping may define a previously determined data request by the requesting device for the template data. Storage of the on-premise gateway device 80 or storage 88 may store the mapping. The mapping may be a predefined mapping between the template data and the requesting device, such that when first template data is requested, the on-premise gateway device 80 and/or the off-premise gateway device determines to access both the first template data and second template data based on an association between the template data indicated via the mapping. Artificial intelligence or machine intelligent algorithms may generate the mapping overtime based on use of the industrial automation system 46 or user specifications. For example, a mapping may be a type of a context that defines a relationship between dataset A and datasets B and C, and thus the on-premise gateway device 80 may acquire dataset B along with dataset C when facilitating a request for dataset A based on the mapping. Other methods may be used to generate the mappings.

Figure 15:
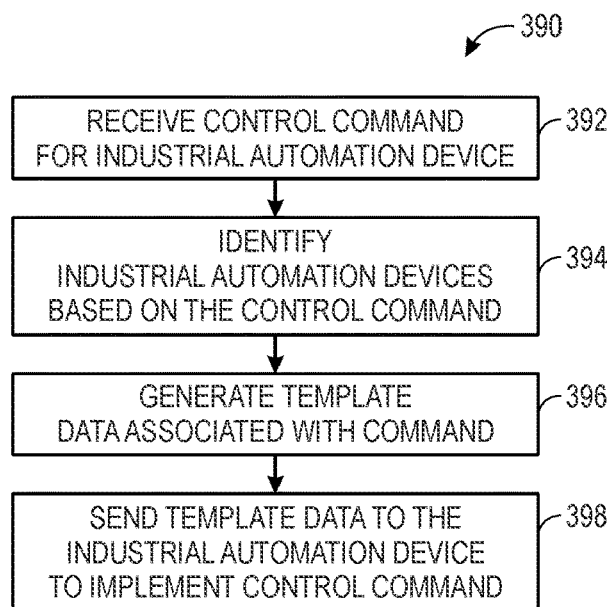
FIG. 15 is a flow diagram of a process for operating the on-premise gateway device to send a control command to an industrial automation device, in accordance with an embodiment.

Related to FIG. 14, FIG. 15 is a flow diagram of a process 390 for operating the on-premise gateway device 80 to send a control command to an industrial automation device 86. Although the process 390 is described as being performed by the on-premise gateway device 80, these operations may be performed in response to processing circuitry of the on-premise gateway device 80 executing instructions stored in a tangible, non-transitory, computer-readable medium, such as a memory of the on-premise gateway device 80, or another suitable memory. Moreover, the operations of the process 390 are shown in a particular order; however, some of the operations may be performed in a different order than what is presented or omitted altogether.

At block 392, the on-premise gateway device 80 may receive a control command for an industrial automation device 86, such as part of a request from the on-premise computing device 74 that includes the control command or an indication of the change to be implemented via the control command. The request with the control command may also include or be a request for template data. The control command may be generated by a legacy device or legacy software that is not enabled with symbolic data operations. Thus, the on-premise gateway device 80 may convert the control command into a protocol or format implementable by the industrial automation device 86 and/or the industrial automation control system 78 enabled with symbolic data operations.

At block 394, the on-premise gateway device 80 may identify one or more industrial automation devices 86 based on the control command. The control command may specifically identify one or more industrial automation devices 86. Sometimes, the control command may apply to a subset of industrial automation devices 86 that satisfy a condition, such as apply to a subset of "industrial automation devices installed after 2013" or another time threshold. Other conditions may similarly apply, such as a type of industrial automation device 86 (e.g., "industrial automation devices having a specific brand"), a unit 50 including the industrial automation device 86 (e.g., "industrial automation devices of a specific unit"), or the like. In some systems, a context, such as a mapping, may define a relationship between two or more industrial automation devices 86. When this occurs, the on-premise gateway device 80 may identify a first industrial automation device 86 from the control command and then may identify one or more related industrial automation devices 86 based on the context.

At block 396, the on-premise gateway device 80 may generate template data associated with the control command. The template data may be used to implement the control command at the one or more industrial automation devices 86 via symbolic data operations. In some embodiments, the template data may be generated based on the mappings described throughout the present application including with respect to FIG. 14.

At block 398, the on-premise gateway device 80 may send the template data to the industrial automation device 86 to implement the control command. After determining the template data, the industrial automation control system 78 may send an additional control signal or publish the updated data to the one or more industrial automation devices 86 to implement the adjustment determined based on the additional template data. To implement the command specified in the template data, the industrial automation device 86 may use references via a combination of one or more template object instances and one or more symbol object instances to store the template data. As a result, a control system (e.g., local control system, industrial automation control system 78) may then operate the industrial automation devices 86 to perform control operations based on the newly stored template data, which may correspond to target operating parameters or the like. Indeed, the control system may adjust the operations to cause the industrial automation devices 86 to achieve the target operating parameters.

In some cases, and as shown in FIG. 13, the on-premise gateway device 80 may be coupled to the off-premise edge gateway device 82. The off-premise gateway device 82 may receive data via a client connection between the clients 360. This way, when template data is updated at the industrial automation device 86, the update is automatically returned to the off-premise edge gateway device 82. The off-premise edge gateway device 82 may convert the received template data into data able to be processed and stored by the off-premise computing device 76.

As described above, the on-premise gateway device 80 may be coupled to the off-premise edge gateway device 82. The on-premise gateway device 80 and the off-premise edge gateway device 82 may exchange data based on the clients 360.

Off-Premise Gateway Device Systems and Methods

To elaborate on operations involving the off-premise edge gateway device 82 and/or the clients 360, the off-premise computing device 76 may collect data and context of data stored on industrial automation components, such as controllers, devices, and the like. Data models may be used to detail a relationship between constraints, rules, data, data values, operations, or other types of information. The data models may specify relationships between kinds or types of data with respect to other types of data. As such, the data models may provide context with regard to how certain datasets are related to other datasets. As a result, a stable and organized structure of information may be provided to different software platforms, devices, and the like via the data models. By way of example, in an industrial automation system that employs operational technology (OT) systems and information technology (IT) systems, data communicated between the OT systems and the IT systems may not include the context (e.g., properties) of the data when the data is transmitted. Instead, raw values of the data may be transmitted without providing the appropriate context regarding the data.

Keeping the foregoing in mind, the off-premise edge gateway device 82 may collect template data from the data sources and the context of the template data using symbolic data operations. Aggregating and converting the template data and the context into a protocol interpretable by the off-premise computing device 76 disposed external to the industrial automation system 46 (e.g., disposed in the off-premise computing domain 100) may improve computing operations by enabling automatic processing operations to operate at the off-premise computing device 76 without further conversion from the protocol of the template data.

To elaborate, the off-premise computing device 76 may include processing circuitry, a memory, a display, and the like. The off-premise edge gateway device 82 may communicatively couple to the on-premise gateway device 80. The coupling may be between the clients 360. As described above the off-premise edge gateway device 82 may connect externally to service software to continuously monitor data and/or perform real-time analysis. To enable these operations, the data may transmit via the on-premise gateway device 80, the industrial automation control system 78, or both to the off-premise edge gateway device 82. The off-premise edge gateway device 82 may be communicatively coupled to a client 360A on the on-premise gateway device 80 to access the template data of the industrial automation devices 86.

The off-premise computing device 76 may execute the SaaS/FaaS platform 108 and may present visualizations on the display in response to the execution of the SaaS/FaaS platform 108. One or more of the visualizations may be based on and/or include data obtained from sources of data, such as the industrial automation system 46 and/or industrial automation devices 86, via the off-premise edge gateway device 82. The SaaS/FaaS platform 108 may perform time-based analysis and/or historical data tracking. The SaaS/FaaS platform 108, through the use of clients 360, may automatically receive updated and converted versions of template data without first sending a request or query. In some cases, a data link may be established in response to a first data request. The first data request may instruct the off-premise gateway device on how to first generate the data link for future automatic updating. For example, the operations of FIG. 16 may be used to establish a data link for the future automatic updating between the industrial automation system and a requesting device.

The on-premise gateway device 80 may collect and preserve the context of the data acquired from various devices (e.g., the industrial automation devices 86, other devices within the industrial automation system 46), such that the on-premise gateway device 80 may transmit the acquired data along with the context of the data. For example, if a context defines a dataset A as including datasets B and C, the computing device may acquire dataset B along with dataset C when facilitating a request for dataset A. By providing the context with retrieved datasets, the off-premise edge gateway device 82 device may provide contextual information regarding relationships between various devices and components in the industrial automation system to external systems (e.g., systems in the off-premise computing domain 100) and enable a coherent data transfer between devices.

In addition to retrieving datasets with specific data structures related to the respective context (e.g., the context of FIG. 9), the on-premise computing device 74, the off-premise computing device 76, and/or the industrial automation control system 78 may provide one or more respective user interfaces that may enable a user to provide the context (e.g., the context of FIG. 9) or information model associated with a particular dataset. In this way, the user may add a context to a dataset or to data, such as via a graphical user interface with input fields that, when receiving a text entry or alternative input, convert the data into a format able to be stored using symbolic data methods with template data. The retrieved dataset may continue to be transmitted to other devices with the added context. By providing data with its context, different software platforms may synthesize or analyze the retrieved template data more efficiently. For instance, unstructured component data provided without context may be pre-processed each time to group relevant datasets together prior to the datasets being analyzed. However, when transmitted with context, some operations related to grouping associated data may be bypassed due at least in part to the context already indicating that information, which may reduce processing costs and times. For example, the template object instance may indicate that a subset of the template data corresponds to a context or an information model, and based on that indication, the on-premise computing device 74, the off-premise computing device 76, the industrial automation device 86, and/or the industrial automation control system 78 may use the subset of the template data to organize or group the template data relative to other template data. Moreover, by retrieving the datasets with the appropriate context, the computing device may acquire datasets and display how the datasets are related via a particular context that the template data has in common between the datasets.

In addition to retrieving template data with context, the on-premise computing device 74, the off-premise computing device 76, and/or the industrial automation control system 78 may provide one or more user interfaces for a user to input transition conditions or transaction conditions to define a workflow for transferring the datasets using the context and/or data model associated with one or more datasets. For instance, the user may describe a workflow using the contexts, like transaction conditions and/or mapping, to control the transition of data between a data generating component (e.g., data source) of the industrial automation system and a data destination component (e.g., data consumer, requesting device). For example, the user may describe a transaction condition by defining a triggering event (e.g., when data value exceeds 300) for data retrieved from a first data source (e.g., a temperature sensor) to initiate capturing data from a second data source (e.g., pressure sensor). In addition, the transaction conditions may define how data will be collected from a data source. That is, the transaction conditions may detail that data is accessed from a data source using a particular collection path and transmission path. In this way, the present embodiments described herein may better enable the user to describe different datasets, associate a dataset to one or more other datasets by defining a relationship between the respective datasets, define transaction conditions to detail a custom workflow for data communication through an industrial automation system using the data model described herein, and the like.

Figure 16:
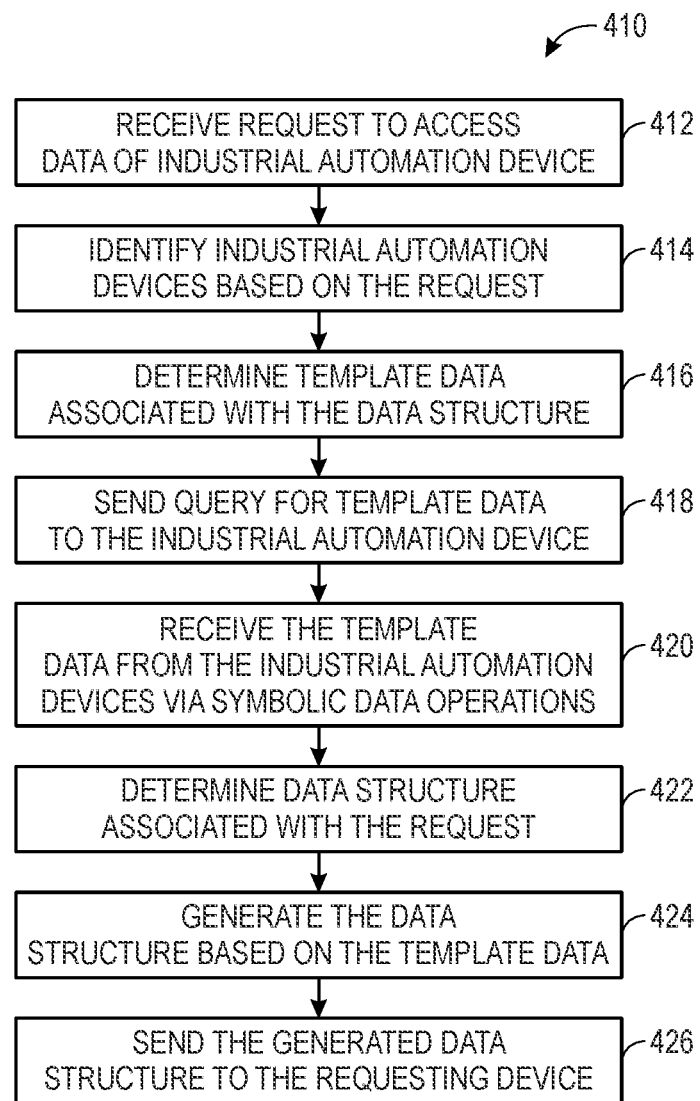
FIG. 16 is a flow diagram of a process for operating the off-premise gateway device to perform a data access operation and template data conversion operation, in accordance with an embodiment.

Keeping the foregoing in mind, FIG. 16 is a flow diagram of a process 410 for operating the off-premise edge gateway device 82 to perform a data access operation. Although the process 410 is described as being performed by the off-premise edge gateway device 82, these operations may be performed in response to processing circuitry of the off-premise edge gateway device 82 executing instructions stored in a tangible, non-transitory, computer-readable medium, such as a memory of the off-premise edge gateway device 82, or another suitable memory. Moreover, the operations of the process 410 are shown in a particular order; however, some of the operations may be performed in a different order than what is presented or omitted altogether.

At block 412, the off-premise edge gateway device 82 may receive a request to access data of an industrial automation device 86. This request may be generated by a portion of the off-premise computing device 76. For example, the SaaS/FaaS platform 108 may generate a request for data of one or more industrial automation devices 86. The request may be generated by a control system directly, on behalf of a connected application or on behalf of the off-premise computing device 76. The request may be generated by a legacy device or legacy software that is not enabled with symbolic data operations. Thus, the off-premise edge gateway device 82 may implement the request for data on behalf of the requesting device.

At block 414, the off-premise edge gateway device 82 may identify one or more industrial automation devices 86 based on the request. The request may specifically identify one or more industrial automation devices 86. In some embodiments, the off-premise edge gateway device 82 may identify or determine template data associated with the request based on information provided in the request itself. For example, the template data may be specifically called out by name or determined based on an input into a data field (e.g., selection or input of an indication of an option via a field with any number of set options) corresponding to the request. Sometimes, the request may cause the off-premise edge gateway device 82 to search for a subset of industrial automation devices 86 associated with the request. The subset of the industrial automation devices 86 may be determined to satisfy a defined condition. For example, the off-premise edge gateway device 82 may search the storage 88 for a subset of industrial automation devices 86 "installed after 2013" or that satisfy another time threshold. Other conditions may be similarly determined and applied from the request. For example, the request may specify a type of industrial automation device 86 (e.g., "industrial automation devices having a specific brand"), a unit 50 including the industrial automation device 86 (e.g., "industrial automation devices of a specific unit"), or the like, on which the query should be executed.

However, if the request does not specify the template data, the off-premise edge gateway device 82 may access a mapping that details relationships between a number of devices, device types, and the like and corresponding template datasets. That is, the request received at block 412 may include template data but it may also lack template data if the device sending the request is unfamiliar or incompatible with symbolic data-based operations. In this case, the off-premise gateway device 82 may consult the mapping to determine a corresponding template data that matches the information (e.g., requested data) provided in the request received at block 412. As such, the mapping may be pre-defined for a number of devices, device types, types of requests, and the like. For example, the mapping may define a relationship between two or more industrial automation devices 86 that may be used to tie together requests for template data between the two or more industrial automation devices 86. When this occurs, the off-premise edge gateway device 82 may identify a first industrial automation device 86 from the request and then may identify one or more related industrial automation devices 86 based on the mapping.

At block 416, the off-premise edge gateway device 82 may determine the template data associated with the request. That is, the request received at block 412 may include template data but it may also lack template data if the device sending the request is unfamiliar or incompatible with symbolic data-based operations.

To convert the data to template data, the off-premise edge gateway device 82 may access a conversion mapping (e.g., mapping) that details relationships between datasets that may be stored by a number of devices, device types, and the like and corresponding template datasets. The off-premise gateway device 82 may consult the conversion mapping to determine a corresponding template data that matches the information (e.g., requested data) provided in the request received at block 412. As such, the mapping may be pre-defined for a number of devices, device types, types of requests, and the like. For example, the mapping may define a relationship between the industrial automation devices 86 and the off-premise computing device 76 that may be used to convert datasets defined in the received requests into template data that may be received or requested from the industrial automation devices 86.

To elaborate, the request that may originate from the off-premise computing device 76 and/or the SaaS/FaaS platform 108 may specify a type of data, a specific dataset, or some other detail that may identify a dataset stored in the industrial automation device 86. However, the dataset may be stored or accessed from the industrial automation device 86 using symbolic data operations, which may include a request for corresponding template data. As such, the off-premise computing device 76 may determine the template data that corresponds to the requested dataset based on the conversion mapping mentioned above.

At block 418, the off-premise edge gateway device 82 may send a query for the template data to the one or more industrial automation devices 86 identified at block 414. Here, the off-premise computing device 76 may request the identified portion of template data (e.g., identified at block 416) or may request all the template data, which may be parsed by the off-premise computing device 76 to identify the requested template data.

At block 420, the off-premise edge gateway device 82 may receive the template data from the one or more industrial automation devices 86 (e.g., requested at block 418). The off-premise computing device 76 may use symbolic data operations to access the template data. In this way, the off-premise computing device 76 may identify which template object instances and symbol object instances to receive data from before receiving the template data from the one or more industrial automation devices 86. For example, using the example in FIG. 11, the off-premise computing device 76 may specify "Floor1.PF525.Online.Motor Status" to receive the template data associated with "motor status" symbol object instance 302.

At block 422, after receiving the template data, the off-premise edge gateway device 82 may determine a data structure associated with the request. The data structure may correspond to an information model or some other format that the SaaS/FaaS platform 108, the database 106, or other off-premise computing device 76 may expect to receive. That is, different types of off-premise computing devices 76 may receive datasets organized according to certain data models. In this way, the received datasets may seamlessly be stored or organized into memory components or appropriate data fields in an efficient matter. Indeed, the data models may provide context, such that the off-premise computing device 76 may efficiently place the appropriate data values of the received dataset into appropriate data fields of the off-premise computing device 76. A data model may detail one or more relationships between certain constraints, rules, data, data values, operations, or other types of information. The data model may specify a relationship between kinds or types of data with respect to other kinds or types of data. As such, the data model may provide context with regard to how certain datasets are related to other datasets. As a result, a stable and organized structure of information may be provided to different software platforms, devices, and the like.

For example, the off-premise edge gateway device 82 may provide a representation of the received template data in a data structure to the off-premise computing device 76 (or another requesting device) according to a data model, thereby providing the off-premise computing device 76 (or the requesting device) with context regarding the received data. The data model may indicate that the received template data is associated with the industrial automation system 46, one or more of the units 50, one or more industrial automation devices 86, one or more components of the industrial automation system 46, or the like. The data model may be defined as to cause the off-premise edge gateway device 82 to process the received template data associated with specific components according to a particular method or protocol. Moreover, the off-premise edge gateway device 82 may use the data model to extract specific details of each component industrial automation device 86. That is, the computing device 24 may process the received data to provide context to datasets received from each industrial component, such as speed, flow, temperature, and acceleration, among other variables. In addition, the data model may provide contextualized data including associations or relationships with other devices, systems, plants, servers, types of devices, or other categories to classify the received data.

At block 424, the off-premise edge gateway device 82 may generate a data structure based on the template data. The data structure generated is based on the data structure identified at block 416. Operations of block 424 may include adding, via the off-premise computing device 76, a context or contextualized data to the data structure based on the industrial automation device 86, the mapping, and the template data. The mapping may be associated with a data model that indicates what additional data associated with the industrial automation device 86 and/or the template data to include with the data structure, which may be defined in the data model based on what types of data the requesting device uses and/or stores. In some cases, the template data may include a context that causes the off-premise computing device 76 to adjust the data structure. For example, the data structure identified at block 416 may include a portion of the data structure to accommodate one child device while the template data indicates two child devices, thus the off-premise computing device 76 may generate the data structure to accommodate the two child devices indicated by the template data.

In some cases, the operations of block 424 may be performed based on the off-premise edge gateway device 82 determining that the data structure does not correspond to a protocol compatible with the off-premise computing device 76. To remedy this, the off-premise edge gateway device 82 may convert the data structure generated based on the template data into converted data based on a protocol compatible with the off-premise computing device 76.

At block 426, the off-premise edge gateway device 82 may send the generated data structure to the requesting device (e.g., the off-premise computing device 76, another suitable requesting device). Here, as noted above, the generated data structure may include data compatible with a protocol and a data structure used by a requesting device. The off-premise edge gateway device 82 may send the generated data structure to the requesting device via the client 360B. The client 360B may update data stored in the requesting device without additional conversion based on the data structure received from the off-premise edge gateway device 82. To access the data of the data structure, the requesting device may perform a refresh of a page, of the data structure used to access the data from the off-premise edge gateway device 82, or the like.

It is noted that the off-premise edge gateway device 82 may receive and process requests from a requesting device coupled downstream from the off-premise computing device 76. In this way, a request from the requesting device may pass through the off-premise computing device 76 to be received by the off-premise edge gateway device 82. Thus, when the off-premise edge gateway device 82 is processing template data to generate the data structure at block 424, the off-premise edge gateway device 82 may process the template data according to specifications (e.g., protocol and/or data structure) of the requesting device and/or a program executed via the requesting device as opposed to the off-premise computing device 76. Sometimes the specifications of the off-premise computing device 76 matches that of the downstream requesting device and in other time the specifications are different. This may involve a technical improvement by enabling the off-premise edge gateway device 82 to be a highly flexible system able to communicate with a wide variety of computing devices, including those coupled downstream from intermediary devices.

Keeping this in mind, the client 360B may also convert and process data into template data and/or may convert and process template data from the industrial automation system 46 into a data structure and data protocol combination compatible with systems and methods used by the requesting device, and vice versa. The off-premise computing device 76 may request the template data via the off-premise edge gateway device 82 but the template data received by the off-premise edge gateway device 82 may be part of an array structure and protocol incompatible with a data structure and protocol used by the off-premise computing device 76 (e.g., if defined as so by the template object instance). For example, the off-premise edge gateway device 82 via the client 360B may detect that the template data is arranged in a single column, multiple row data structure and may convert the template data to data arranged in a multiple page, multiple column, and multiple row data structure compatible with the off-premise computing device 76. This conversion may occur based on the information about the template data from a corresponding template object instance for the template data. For example, the template object instance may indicate a respective format of each portion of the template data and may provide a context regarding that portion of the template data to indicate to the off-premise gateway device 82 how to place the data (e.g., converted template data) within the data structure for use by the off-premise computing device 76. Thus, the off-premise computing device 76 may convert the template data into the data structure and protocol used by the requesting device or a compatible data structure and protocol. These operations may involve the off-premise edge gateway device 82 converting the template data to data, and then converting the data to a data structure compatible with the industrial automation devices 86 and/or the off-premise computing device 76. When doing so, the off-premise edge gateway device 82 may combine some or all of the template data from different industrial automation devices 86 into the same generated data structure. The off-premise edge gateway device 82 may populate an existing data structure with the data converted from the template data and/or may generate a new data structure to be populated with the data converted from the template data. The new data structure may be received by the off-premise computing device 76 and saved over some or all of an existing data structure. In some cases, the client 360B may automatically store the resulting data structure (from the converted template data) in the off-premise computing device 76.

In some embodiments, the data structure transmitted from the off-premise computing device 76 to the requesting device may include a subset or all of the template data from the industrial automation devices 86 identified at block 414. The off-premise computing device 76 may determine from the data structure used by the requesting device which of the template data to convert and transmit to the requesting device. The off-premise computing device 76 may access the data structures used by the requesting device to make the determination of subset of template data and/or the off-premise computing device 76 may receive an indication of the data structure from the requesting device. In some cases, the off-premise computing device 76 may access an indication in memory that defines which of the template data is to be transmitted to the requesting device.

Data transmitted between the off-premise computing device 76 and the industrial automation system 46 may be exchanged wirelessly or via wired connection. The off-premise computing device 76 may receive data directly from the industrial automation system 46 via the industrial automation control system 78. In some cases, the off-premise computing device 76 may receive data from a client-to-client connection between clients 360. Furthermore, sometimes the off-premise computing device 76 may receive data from the industrial automation devices 86 via the on-premise gateway device 80. In any of the cases, one or more of the clients 360 may be bypassed or additional clients not depicted in FIG. 13 may be included and used in the communications.

In some cases, one or more of the industrial automation devices 86 may update stored template data in response to implementing a control command, such as a control command generated by the on-premise gateway device 80. Other systems may generate the control command, such as the industrial automation control system 78 and/or the off-premise gateway device. The update to the template data may occur in response to sensing data being stored as at least a portion of the template data, overwriting some amount of previously stored data. In this situation, the off-premise gateway device 82 may, after sending the data structure to the requesting device at block 426, determine that the template data was updated by the industrial automation device 86 and generate an updated data structure based on the updated template data in response to determining that the template data was updated. Then, the off-premise gateway device 82 may transmit the updated data structure the requesting device to autonomously update the data stored or referenced by at least a portion of the requesting device. This update operation may occur without further intervention or without an additional request being issued (e.g., an additional request similar to the request of block 412).

Technical effects of the systems and methods described herein include using symbolic data methods to enable direct access and reporting of industrial automation system data. By using these systems and methods, one or more intermediary control systems may be incorporated into the industrial automation system to aggregate or process data generated by industrial automation devices. Furthermore, the systems and methods described herein may enable operational technology (OT) systems and information technology (IT) systems, that otherwise may not transmit context (e.g., properties) associated with data when transmitting the data, to include the context when transmitting the data. Indeed, an industrial automation device may generate and/or store template data generated by its systems and components along with context data. Template data may be accessed by control systems and other devices of the industrial automation system. One or more template object instances may correspond to the template data and characterize the template data to enable the control systems and other devices to process and handle the template data. A template object instance on a device may reference a nested template object instance. In some cases, a symbol object instance may reference a nested template object instance, which may increase efficiency when managing and communicating data throughout an industrial system by enabling reference to a template object instance or a symbol object instance to include reference to multiple template object instances or symbol object instances nested in that reference. Indeed, preparing data based on template object instances and symbol object instances may allow for more efficient processing, uniform comparisons between datasets generated by different devices, or the like. By using systems and methods to reference operational data in a manner using labels understandable to both machine and software, fewer look-up operations may be used to route data from a data source to a data consuming device, and thus fewer computing operations may be used to implement control and processing operations relative to other systems not using symbolic data operations.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method comprising:
receiving, via a processor, a first symbol object instance of a plurality of symbol object instances from an industrial automation device, wherein a first template object instance is configured to characterize a dataset stored in a memory component accessible to the industrial automation device, and wherein each of the plurality of symbol object instances is categorized with respect to a plurality of categories comprising an identity of the industrial automation device, a state of the industrial automation device, a runtime status of the industrial automation device, maintenance status associated with the industrial automation device, sustainability information of the industrial automation device, or any combination thereof;
identifying, via the processor, a type of the industrial automation device based on the first symbol object instance;
generating, via the processor, first template data based on the type of the industrial automation device and the first symbol object instance, wherein the first template data comprises one or more instantaneous values associated with the dataset and one or more of the plurality of categories associated with the first symbol object instance, and wherein the first template data comprises one or more template datasets associated with one or more child devices communicatively coupled to the industrial automation device;

storing, via the processor, the first template data in a data repository in association with the first template object instance comprising a plurality of indications of the one or more of the plurality of categories, wherein the first template object instance is configured to correspond to one or more nested template object instances corresponding to the one or more child devices;

generating, via the processor, second template data and a second template object instance based on a control command to be applied to the industrial automation device; and sending, via the processor, the second template data and the second template object instance to the industrial automation device, wherein the industrial automation device is configured to adjust an operation of the one or more child devices based on the second template data and the second template object instance.

2. The method of claim 1, wherein the data repository comprises a plurality of datasets stored as common data exposed to a plurality of other industrial automation devices, and wherein each of the plurality of other industrial automation devices is configured to communicate with an additional industrial automation device having the type using a template data definition associated with the type.

3. The method of claim 1, wherein the first template data comprises context data associated with a sensor that acquired the dataset, and wherein the context data comprises a label describing the sensor, a timestamp associated with each of the one or more instantaneous values, a relative location of each of the one or more instantaneous values within the first template data, or any combination thereof.

4. The method of claim 1, comprising:
receiving, via the processor, third template data from the industrial automation device;
storing, via the processor, the third template data in an additional memory component accessible to the processor to replace the first template data in the additional memory component;
determining, via the processor, an adjustment to an operation of the industrial automation device based on the third template data; and
generating, via the processor, fourth template data and a fourth template object instance to implement the adjustment.

5. The method of claim 4, wherein sending, via the processor, the additional control signal comprises sending, via the processor, the additional control signal to the industrial automation device based on a difference between the third template data and the first template data exceeding a threshold value.

6. The method of claim 1, wherein the plurality of symbol object instances are configured to enable the processor direct access to the dataset while the dataset remains stored in the memory component, and wherein the memory component is configured to store the dataset at a time before the industrial automation device is communicatively coupled to the processor.

7. A tangible, non-transitory, computer-readable medium comprising instructions that, when executed by a processor, causes a control system to perform operations comprising:

receiving a first symbol object instance of a plurality of symbol object instances from an industrial automation device, wherein the first symbol object instance is configured to characterize a dataset stored in a memory component accessible to the industrial automation device, and wherein each of the plurality of symbol object instances is categorized with respect to a plurality of categories comprising an identity of the industrial automation device, a state of the industrial automation device, a runtime status of the industrial automation device, maintenance status associated with the industrial automation device, sustainability information of the industrial automation device, or any combination thereof, identifying a type of the industrial automation device based on the first symbol object instance;

identifying a child component based on the type of the industrial automation device and the first symbol object instance;

generating first template data based on the child component, the type of the industrial automation device, and the first symbol object instance, wherein the first template data comprises one or more instantaneous values associated with the dataset and one or more instantaneous values associated with the child component, and wherein a first template object instance comprises indications of one or more of the plurality of categories associated with the first symbol object instance;

storing the first template data in a data repository in association with the first template object instance, wherein the first template object instance is configured to correspond to a nested template object instance corresponding to the child component;

determining an adjustment to an operation of the child component based on the one or more instantaneous values associated with the child component and the first template object instance;

generating second template data and a second template object instance to implement the adjustment; and sending the second template data and the second template object instance to the industrial automation, wherein the industrial automation device is configured to adjust an operation of the child component based on the second template data and the second template object instance.

8. The tangible, non-transitory, computer-readable medium of claim 7, wherein the identity of the industrial automation device comprises data corresponding to:
vendor identifier data configured to indicate a vendor of the industrial automation device;
serial number data of the industrial automation device;
firmware version data of the industrial automation device;
warranty information data of the industrial automation device; or
any combination thereof.

9. The tangible, non-transitory, computer-readable medium of claim 7, wherein the state of the industrial automation device comprises data indicative of present operational state of the industrial automation device.

10. The tangible, non-transitory, computer-readable medium of claim 7, wherein the runtime status of the industrial automation device comprises present operating parameter data, and wherein the present operating parameter data includes:
current data;
voltage data;
torque data;

velocity data;
temperature data; or
any combination thereof.

11. The tangible, non-transitory, computer-readable medium of claim 7, wherein the maintenance status of the industrial automation device comprises data that quantifies an amount of operational time remaining of the industrial automation device.

12. The tangible, non-transitory, computer-readable medium of claim 7, wherein the sustainability information of the industrial automation device comprises data indicative of an environmental metric.

13. The tangible, non-transitory, computer-readable medium of claim 7, the operations comprising:
receiving third template data from the industrial automation device;
storing the third template data in an additional memory component accessible to the processor to replace the first template data in the additional memory component; and
determining the adjustment based on the first template object instance and a difference between one or more additional instantaneous values associated with the child component in the third template data and the one or more instantaneous values associated with the child component in the first template data.

14. The tangible, non-transitory, computer-readable medium of claim 7, wherein the child component comprises a device disposed within the industrial automation device.

15. The tangible, non-transitory, computer-readable medium of claim 7, wherein the operations comprise:
selecting the first template object instance from a plurality of template object instances based on the type, wherein the data repository is configured to store the plurality of template object instances;
determining a second symbol object instance corresponding to a template dataset associated with the child component based on the first template object instance; and
accessing the template dataset associated with the child component via the second symbol object instance.

16. A tangible, non-transitory, computer-readable medium comprising instructions that, when executed by a processor, causes a control system to perform operations comprising:
receiving a first symbol object instance of a plurality of symbol object instances from an industrial automation device, wherein a first template object instance is configured to characterize a dataset stored in a memory component accessible to the industrial automation device, and wherein each of the plurality of symbol object instances is categorized with respect to a plurality of categories comprising an identity of the industrial automation device, a state of the industrial automation device, a runtime status of the industrial automation device, maintenance status associated with the industrial automation device, sustainability information of the industrial automation device, or any combination thereof;
identifying a type of the industrial automation device based on the first symbol object instance;
generating first template data based on the type of the industrial automation device and the first symbol object instance, wherein the first template data comprises one or more instantaneous values associated with the dataset and one or more of the plurality of categories associated with the first symbol object instance, and wherein the first template data comprises a plurality of template datasets associated with a plurality of child devices communicatively coupled to the industrial automation device;
storing, via the processor, the first template data in a data repository in association with the first template object instance comprising a plurality of indications of the one or more of the plurality of categories, wherein the first template object instance is configured to correspond to one or more nested template object instances respectively corresponding to each child device of the plurality of child devices;
generating second template data and a second template object instance based on a control command to be applied to the industrial automation device; and
sending, via the processor, the second template data and the second template object instance to the industrial automation device, wherein the industrial automation device is configured to adjust an operation of one or more child devices of the plurality of child devices based on the second template data and the second template object instance.

17. The tangible, non-transitory, computer-readable medium of claim 16, wherein the data repository comprises a plurality of datasets stored as common data exposed to a plurality of other industrial automation devices, and wherein each of the plurality of other industrial automation devices is configured to communicate with an additional industrial automation device having the type using the first template data.

18. The tangible, non-transitory, computer-readable medium of claim 16, wherein the first template data comprises context data associated with a sensor that acquired the dataset, and wherein the context data comprises a label describing the sensor, a timestamp associated with each of the one or more instantaneous values, a relative location of each of the one or more instantaneous values within the first template data, or any combination thereof.

19. The tangible, non-transitory, computer-readable medium of claim 16, the operations comprising:
receiving third template data from the industrial automation device;
sending the third template data to an edge device;
receiving a request to adjust operation of the industrial automation device from the edge device after sending the third template data;
generating fourth template data and a fourth template object instance to implement the request to adjust the operation of the industrial automation device.

20. The tangible, non-transitory, computer-readable medium of claim 16, the operations comprising:
identifying the plurality of child devices based on the type of the industrial automation device and the first symbol object instance;
receiving third template data from the industrial automation device;
storing the third template data in an additional memory component accessible to the processor to replace the second template data in the additional memory component, wherein all values of the third template data equal that of the first template data except for data corresponding to the plurality of child devices;
determining an adjustment to an operation of the industrial automation device based on a difference between the data corresponding to the plurality of child devices in the third template data and in the plurality of template datasets; and sending fourth template data and a fourth template object instance to implement the adjustment at the industrial automation device.

* * * * *